United States Patent
Lazar et al.

(10) Patent No.: US 9,171,249 B2
(45) Date of Patent: Oct. 27, 2015

(54) SYSTEMS AND METHODS FOR IDENTIFICATION OF SPIKE-PROCESSING CIRCUITS

(71) Applicant: THE TRUSTEES OF COLUMBIA UNIVERSITY IN THE CITY OF NEW YORK, New York, NY (US)

(72) Inventors: Aurel A. Lazar, New York, NY (US); Yevgeniy B. Slutskiy, Brooklyn, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/591,327

(22) Filed: Jan. 7, 2015

(65) Prior Publication Data

US 2015/0220832 A1    Aug. 6, 2015

Related U.S. Application Data

(63) Continuation of application No. PCT/US2013/050115, filed on Jul. 11, 2013.

(60) Provisional application No. 61/671,332, filed on Jul. 13, 2012.

(51) Int. Cl.
     *G06F 15/18*      (2006.01)
     *G06N 3/08*      (2006.01)

(52) U.S. Cl.
     CPC ........................................ *G06N 3/08* (2013.01)

(58) Field of Classification Search
     None
     See application file for complete search history.

(56) References Cited

U.S. PATENT DOCUMENTS

| | | | |
|---|---|---|---|
| 7,336,210 B2 * | 2/2008 | Lazar | 341/110 |
| 7,479,907 B2 * | 1/2009 | Lazar | 341/110 |
| 7,573,956 B2 * | 8/2009 | Lazar et al. | 375/340 |
| 8,023,046 B2 * | 9/2011 | Lazar et al. | 348/723 |
| 8,874,496 B2 * | 10/2014 | Lazar et al. | 706/16 |
| 9,013,635 B2 * | 4/2015 | Lazar et al. | 348/723 |
| 9,014,216 B2 * | 4/2015 | Lazar et al. | 370/521 |
| 2006/0261986 A1 * | 11/2006 | Lazar | 341/50 |
| 2008/0100482 A1 * | 5/2008 | Lazar | 341/110 |
| 2010/0225824 A1 * | 9/2010 | Lazar et al. | 348/723 |
| 2010/0303101 A1 * | 12/2010 | Lazar et al. | 370/521 |

(Continued)

OTHER PUBLICATIONS

Functional Identification of Spike-Processing Neural Circuits Lazar, A ; Slutskiy, Y Neural Computation vol. 26 , Issue: 2 DOI: 10.1162/NECO_a_00543 Publication Year: 2014 , pp. 264-305.*

An 8-channel neural spike processing IC with unsupervised closed-loop control based on spiking probability estimation Tong Wu ; Zhi Yang Engineering in Medicine and Biology Society (EMBC), 2014 36th Annual International Conference of the IEEE DOI: 10.1109/EMBC.2014.6944812 Publication Year: 2014 , pp. 5260-5263.*

(Continued)

*Primary Examiner* — Michael B Holmes
(74) *Attorney, Agent, or Firm* — Baker Botts L.L.P.

(57) ABSTRACT

Techniques for the identification of a spike-processing circuit are provided. An exemplary method includes receiving spike trains corresponding to a circuit input over a time period, and selecting a number of spikes for each of input spike trains over a predetermined time window. Each of the selected spikes can be replaced with a sampled reproducing kernel to obtain a plurality of signals, and each obtained signal can correspond to one of the input spike trains. Each of the obtained signals can be passed through a plurality of receptive fields or filters to obtain an aggregate filter output signal. The filter output signal can be encoded into an output spike train, and the output spike train can correspond to a response of the circuit to the plurality of input spike trains.

34 Claims, 21 Drawing Sheets

(56) References Cited

U.S. PATENT DOCUMENTS

| | | | |
|---|---|---|---|
| 2012/0039399 A1* | 2/2012 | Lazar et al. | 375/240.29 |
| 2012/0084040 A1* | 4/2012 | Lazar et al. | 702/108 |
| 2013/0311412 A1* | 11/2013 | Lazar et al. | 706/16 |
| 2014/0100472 A1* | 4/2014 | Englund et al. | 600/547 |
| 2014/0267606 A1* | 9/2014 | Lazar et al. | 348/43 |
| 2014/0279778 A1* | 9/2014 | Lazar et al. | 706/22 |

OTHER PUBLICATIONS

Broadcast and Weight: An Integrated Network for Scalable Photonic Spike Processing Tait, A.N.; Nahmias, M.A.; Shastri, B.J.; Prucnal, P.R. Lightwave Technology, Journal of vol. 32, Issue: 21 DOI: 10.1109/JLT.2014.2345652 Publication Year: 2014, pp. 4029-4041.*

* cited by examiner

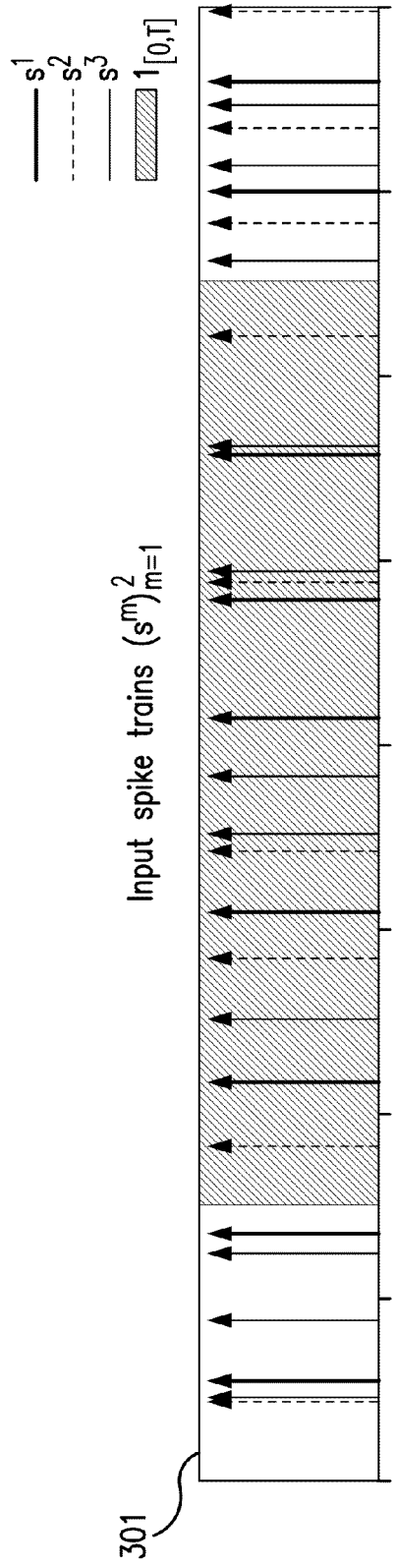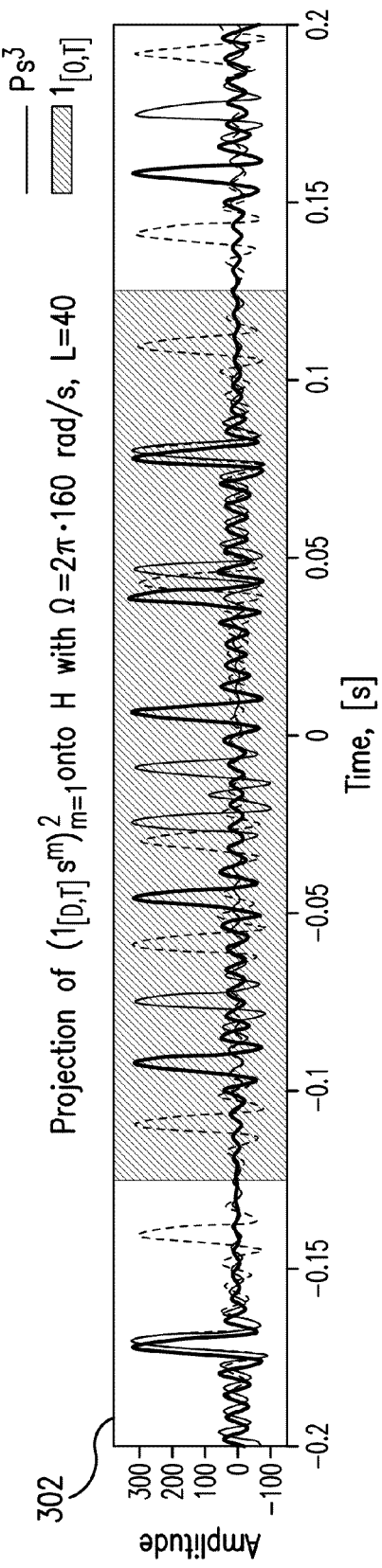
FIG. 3A
FIG. 3B

SYSTEMS AND METHODS FOR IDENTIFICATION OF SPIKE-PROCESSING CIRCUITS

CROSS-REFERENCE TO RELATED APPLICATIONS

This application is a continuation of International Application No. PCT/US2013/050115, filed on Jul. 11, 2013, which claims priority to U.S. Provisional Application Ser. No. 61/671,332, filed on Jul. 13, 2012, each of which is incorporated by reference in its entirety.

BACKGROUND

One aspect of sensory neuroscience is the development of techniques for understanding the functional organization of sensory systems. Comprehensive models of sensory processing can suffer at least in part due to a lack of methods for estimating spike-processing neural circuits in higher brain centers.

Certain neural circuit models and methods for their identification can assume rate-based systems, and can consider both the input (stimuli) and the output (response rates) to be in the continuous domain. However, outputs of most neurons in a sensory system can be sequences of all-or-none action potentials. Furthermore, input signals can be continuous in some cases only for neurons located at the sensory periphery. In contrast, input signals for neurons upstream of sensory neurons can be spatiotemporal spike trains. As such, there is a need to develop a framework for the estimation of both receptive fields in the periphery and of spatiotemporal spike processing upstream.

SUMMARY

Systems and methods for identification of a spike-processing circuit are provided. According to one aspect of the disclosed subject matter, methods for identification of a spike-processing circuit are provided. An exemplary method includes receiving spike trains corresponding to a circuit input over a time period, and selecting a number of spikes for each of input spike trains over a predetermined time window. Each of the selected spikes can be replaced with a sampled reproducing kernel to obtain a plurality of signals, and each obtained signal can correspond to one of the input spike trains. Each of the obtained signals can be passed through a plurality of receptive fields or filters to obtain an aggregate filter output signal. The filter output signal can be encoded into an output spike train, and the output spike train can correspond to a response of the circuit to the plurality of input spike trains.

In some embodiments, the circuit input can correspond to an input to a neuron, an asynchronous sampling circuits, or an oscillator circuit. The circuit input can include a lateral input and a feedback input. One or more of the obtained signals can include a periodic signal. The filter output signal can include a dendritic current.

In some embodiments, the encoding the filter output signal can include encoding using an integrate-and-fire neuron. Additionally or alternatively, the encoding the filter output signal can include encoding using a Hodgkin-Huxley neuron. The encoding the filter output signal can include encoding using an Asynchronous Sigma Delta Modulator (ASDM). The encoding the filter output signal can include encoding using an oscillator. The oscillator can include additive or multiplicative coupling, and in some embodiments, the oscillator can include a van der Pol oscillator.

In some embodiments, the predetermined time window can correspond to $2\pi L/\Omega$, where L corresponds to an order of a signal space of the plurality of input spike trains and $\Omega$ corresponds to a bandwidth of the plurality of input spike trains. The number of windows can be N, the number of receptive fields can be M, and the number of selected spikes can be greater than or equal to $M(2L+1)+N$.

In some embodiments, each of the plurality of receptive fields can have a single dimension over time. The method can include receiving a plurality of continuous, one-dimensional signals corresponding to the circuit input, and each of the plurality of receptive fields can have a single dimension over time. The method can further include receiving a plurality of continuous signals having a dimension greater than one, and one or more of the plurality of receptive fields can include a one-dimensional filter and one or more of the plurality of receptive fields can include a multi-dimensional filter. The plurality of continuous signals can include one or more audio-visual signals.

According to another aspect of the disclosed subject matter, systems for identification of a spike-processing circuit are provided. An exemplary system includes one or more inputs configured to receive a plurality of spike trains corresponding to a circuit input over a time period. A windowing circuit can be operatively coupled to the one or more inputs and configured to select a number of spikes for each of the plurality of spike trains over a predetermined time window. A kernel processor can be configured to receive the selected spikes and replace each of the selected spikes with a sampled reproducing kernel to obtain a plurality of signals. Each obtained signal can correspond to one of the plurality of input spike trains. A plurality of receptive fields or filters can obtain an aggregate filter output signal from the obtained signals. A neuronal encoder can be configured to receive the aggregate dendritic current and encode an output spike train, the output spike train corresponding to a response of the circuit to the plurality of input spike trains.

In some embodiments, the circuit input can correspond to an input to a neuron, an asynchronous sampling circuits, or an oscillator circuit. The circuit input can include a lateral input and a feedback input. One or more of the obtained signals can include a periodic signal. The filter output signal can include a dendritic current.

In some embodiments, the neuronal encoder can include an integrate-and-fire neuron. Additionally or alternatively, the neuronal encoder can include a Hodgkin-Huxley neuron. The neuronal encoder can include an Asynchronous Sigma Delta Modulator (ASDM). The neuronal encoder can include an oscillator. The oscillator can include additive or multiplicative coupling, and in some embodiments, the oscillator can include a van der Pol oscillator.

In some embodiments, the predetermined time window can correspond to $2\pi L/\Omega$, where L can correspond to an order of a signal space of the plurality of input spike trains and $\Omega$ can correspond to a bandwidth of the plurality of input spike trains. The number of windows can be N, the number of receptive fields can be M, and the number of selected spikes can be greater than or equal to $M(2L+1)+N$.

In some embodiments, each of the plurality of receptive fields can have a single dimension over time. The one or more inputs can be further configured to receive a plurality of continuous, one-dimensional signals corresponding to the circuit input, and each of the plurality of receptive fields can have a single dimension over time. The one or more inputs can be further configured to receive a plurality of continuous signals having a dimension greater than one, one or more of the plurality of receptive fields can include a one-dimensional filter, and one or more of the plurality of receptive fields can include a multi-dimensional filter. The plurality of continuous signals can include one or more audio-visual signals.

BRIEF DESCRIPTION OF THE DRAWINGS

FIGS. 3A-3D illustrate an exemplary kernel processor with multiple spikes provided at the input to an exemplary temporal receptive field of a neuron according to the disclosed subject matter.

DETAILED DESCRIPTION

Systems and methods for estimating receptive fields in circuit models are presented. The circuit models can incorporate biophysical spike-generating mechanisms (for example and without limitation, the Hodgkin-Huxley neuron) and can admit both continuous sensory signals and multidimensional spike trains as input stimuli. As such, the circuit models can allow for the nonlinear nature of spike generation that can result in significant interactions between various stimulus features and can affect the estimation of receptive fields. Furthermore, the systems and methods presented herein can estimate receptive fields directly from spike times produced by a neuron, thereby removing the need to repeat experiments in order to compute the neuron's instantaneous rate of response (for example, in a post-stimulus time histogram (PSTH)).

As referenced herein, the term "spike" or "spikes" can refer generally to electrical pulses or action potentials, which can be received or transmitted by a spike-processing circuit. The spike-processing circuit can include, for example and without limitation, a neurons or a neuronal circuits.

Figure 1A:
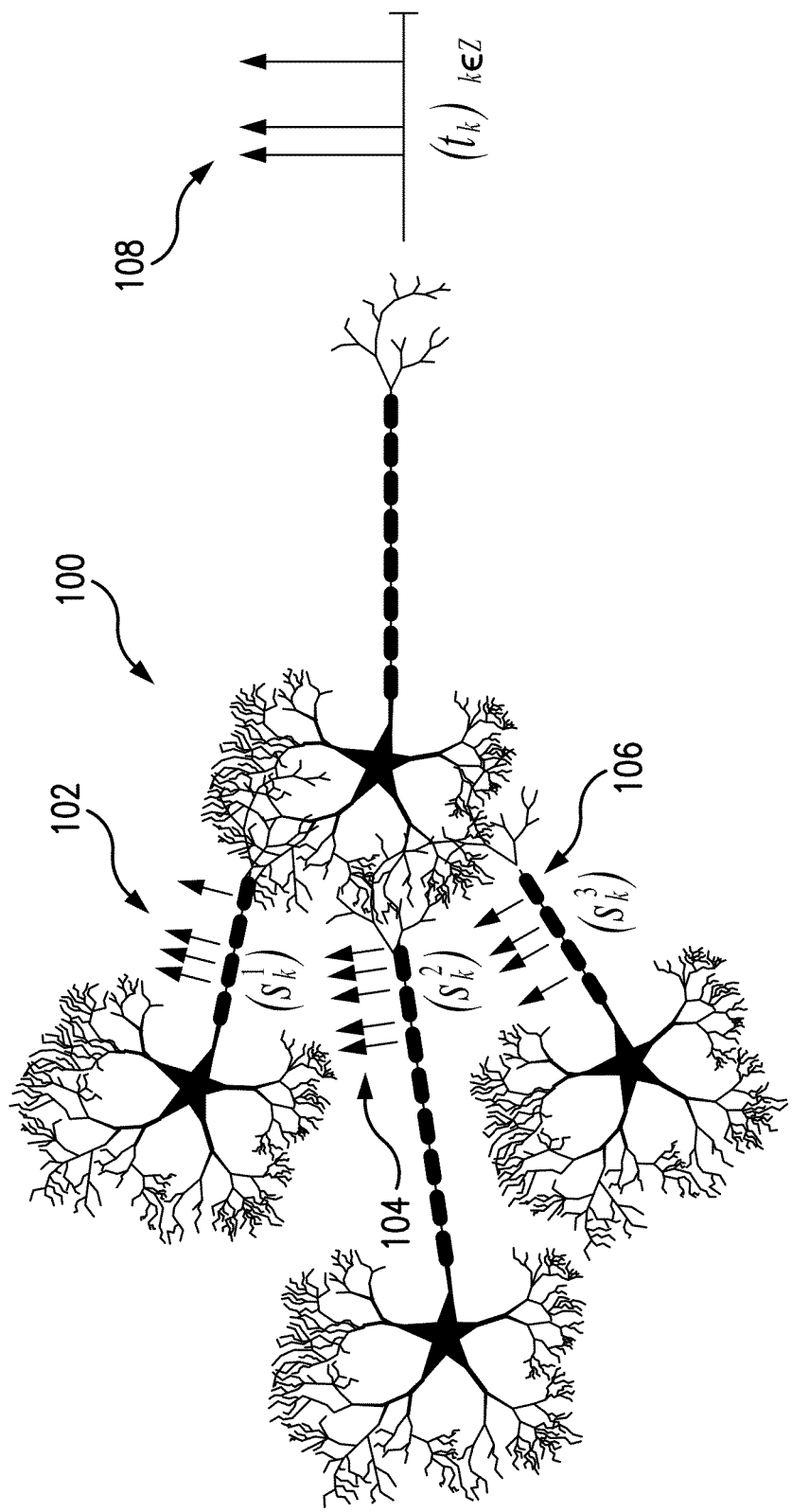
FIG. 1A illustrates an exemplary neural circuit for use with the disclosed subject matter.
Figure 1B:
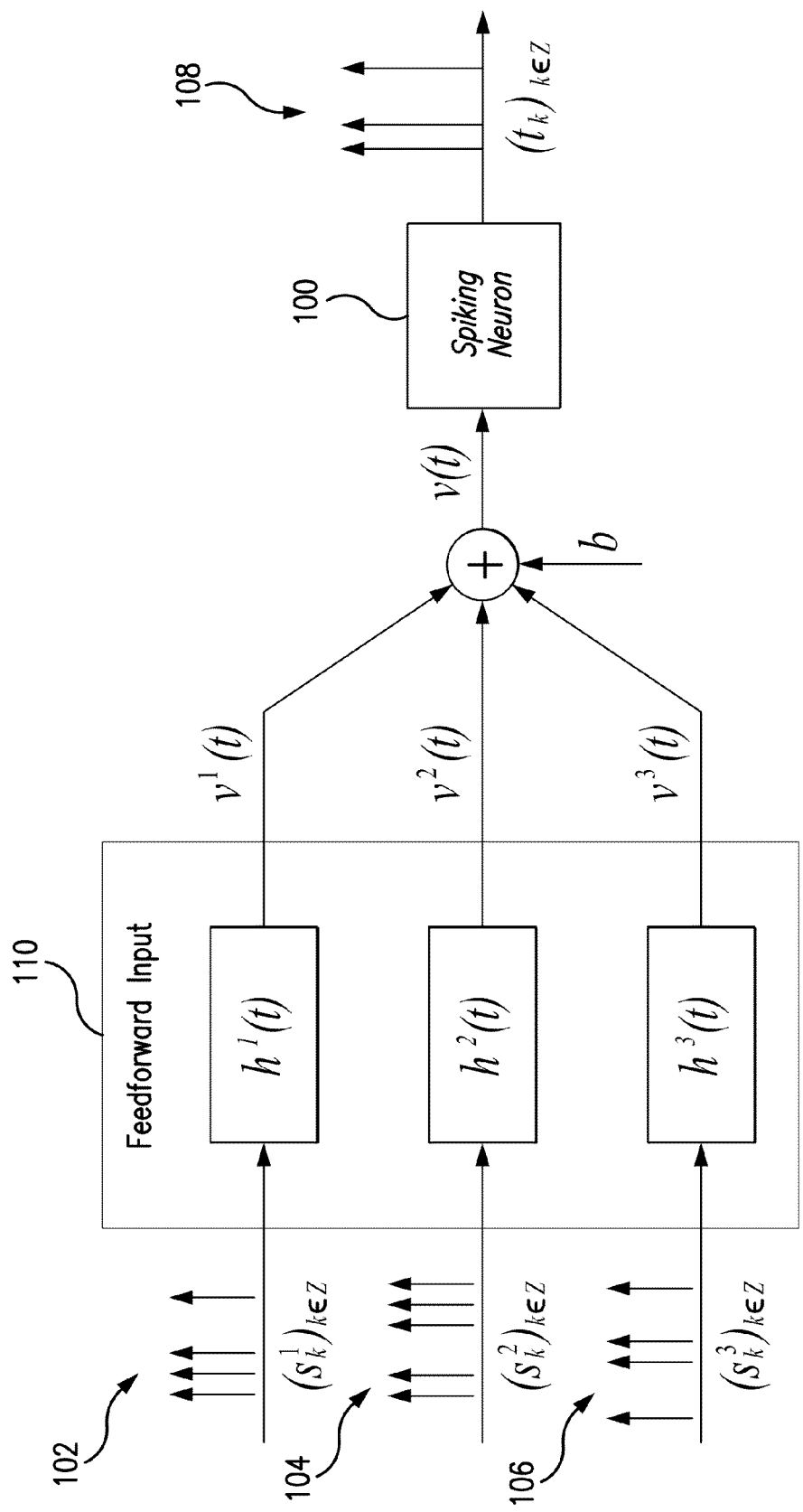
FIG. 1B illustrates an exemplary neural circuit model according to the disclosed subject matter.

FIG. 1A illustrates an exemplary neuron 100 for use with the disclosed subject matter. The neuron 100 can receive $M \in N$ trains 102, 104, 106 of action potentials $s^1, \ldots, s^M$ (for purpose of illustration, and as embodied herein, M=3) and can encode a resulting dendritic current into single train of action potentials produced at times $(t_k)_{k \in Z}$. FIG. 1B illustrates an exemplary neural circuit for use with the disclosed subject matter. The analog dendritic processing can be modeled in the neural circuit using M temporal receptive fields with kernels $h^1, \ldots, h^M$. Action potentials can be generated by a spiking neuron, for example and without limitation, the Hodgkin-Huxley neuron. The neural circuit can include a plurality of neurons, which can be connected to each other and can include feedback. Each neuron can receive a plurality of input spike trains from neurons in its own layer as well as from other layers. Furthermore, neural circuits can receive a combination of spiking inputs and continuous inputs. Continuous inputs can be of arbitrary dimension and can have corresponding multidimensional receptive fields associated with them. Some examples of continuous inputs include audio-visual signals, such as video, audio and images, auditory signals, olfactory signals as well as functions of time.

With reference to FIG. 1A, the neuron 100 can receive $M \in N$ trains of action potentials from other neurons. Presynaptic action potentials can arrive at times $(s_k^m)_{k \in Z}$, m=1, ..., M, and can be processed by the dendritic tree of the neuron. The aggregate dendritic current can be encoded into a single postsynaptic train of action potentials 108 produced at times $(t_k)_{k \in Z}$. As discussed further herein, the dendritic processing of presynaptic spikes can be identified, including, for example and without limitation, where both presynaptic and postsynaptic spikes are available to an observer. The aggregate dendritic current in each neuron can be encoded by an integrate-and-fire neuron. Additionally or alternatively, the aggregate dendritic current can be encoded by a nonlinear dynamical system such as Hodgkin-Huxley, Morris-Lecar, Fitzhugh-Nagumo, Wang-Buzsaki, or the bursting Hindmarsh-Rose neuron.

Each arriving spike can be represented as a Dirac-delta function $\delta(t)$, $t \in R$, and as such the train of spikes $s^m$ from a presynaptic neuron m, m=1, ..., M, can be represented as $s^m(t) = \Sigma_{k \in Z} \delta(t - s_k^m)$, $t \in R$. The spike times $s_k^m$ can be assumed not to be events associated with a Poisson process and thus can correspond to peaks (or troughs) of action potentials as measured in intracellular or extracellular recordings.

With reference to FIG. 1B, the processing of each spike train 102, 104, 106 $s^m$ can be considered to be linear and can be described by a temporal receptive field 110 with a kernel $h^m$. The aggregate postsynaptic current can then be represented as $v(t) = \Sigma_{m=1}^{M}(s^m * h^m)(t) = \Sigma_{m=1}^{M} \Sigma_{k \in Z} h^m(t - s_k^m)$, where $(s^m * h^m)$ can represent the convolution of $s^m$ with $h^m$. Kernels $h^m$ can be represented as finite-energy functions with a finite temporal support (memory) on the interval [0, S], and as such, $h^m$ can be in the space $H = \{h \in L^2(R) | supp(h) \subseteq [0, S]\}$. Each kernel $h^m$ can be approximated arbitrarily closely (in the $L^2$ norm) on [0, S] by its projection $\mathcal{P} h^m$ in the space of trigonometric polynomials $\mathcal{H}$:

For purpose of illustration, the space of trigonometric polynomials $\mathcal{H}$ can be represented as the Hilbert space of complex-valued functions $u(t) = \Sigma_{l=-L}^{L} u_l e_l(t)$, where $e_l(t) = \exp(jl\Omega t/L)/\sqrt{T}$, l=-L, ..., L, can represent an orthonormal basis, $u_l \in C$, $t \in [0, T]$. As such, $T = 2\pi L/\Omega$ can represent the period, $\Omega$ can represent the bandwidth and L can represent the order of the space. Endowed with the inner product $(u, w) = \int_0^T u(t)$ $\overline{w(t)}dt$, $\mathcal{H}$ can represent a reproducing kernel Hilbert space (RKHS) with a reproducing kernel (RK) represented by $K(s,t)=\Sigma_{l=-L}^{L}e_l(s)\overline{e_l(t)}$.

The conditions for an arbitrarily-close $L^2$ approximation of the kernel h∈H by its projection $\mathcal{P}$ h∈$\mathcal{H}$ can be such that T≥S and that the bandwidth Ω and the order L of the space $\mathcal{H}$ are sufficiently high. That is, for a period T, L/Ω can be constant and $\mathcal{P}$ h can correspond to the $L^{th}$ Fourier series of h. Thus, for a given number epsilon>0, a value of L and Ω can be determined such that the mean squared error between $\mathcal{P}$ h and h, is smaller than epsilon. The values of L and Ω can be determined by the spectral and temporal supports of the receptive fields, which can be represented as conditions for convergence of the Fourier series.

The model of action potential generation can be chosen from a wide class of spiking neuron models, including any nonlinear conductance-based model with a stable limit cycle, for example and without limitation, a Hodgkin-Huxley model, Fitzhugh-Nagumo model, Morris Lecar model, an integrate-and-fire (IAF) neuron or a thresholding model. For purpose of illustration only and not limitation, the model of the action potential is embodied herein as the IAF neuron. Nevertheless, the model can be extended to conductance-based models, as discussed further herein.

With a dendritic current $v(t)$, $t \in \mathbb{R}$, an IAF neuron with a bias $b \in \mathbb{R}_+$, a capacitance $C \in \mathbb{R}_+$ and a threshold $\delta \in \mathbb{R}_+$ can be represented by the t-transform $$\mathcal{L}_k(v) = \int_{t_k}^{t_{k+1}} v(t)dt = q_k, k \in \mathbb{Z}_+ \quad (1)$$

where $\mathcal{L}_k$ can represent a linear functional and $q_k = C\delta - b(t_{k+1} - t_k)$. At each spike time $t_{k+1}$, the IAF neuron can provide a measurement $q_k$ of the signal $v(t)$ on the time interval $(t_k, t_{k+1})$.

Figure 2:
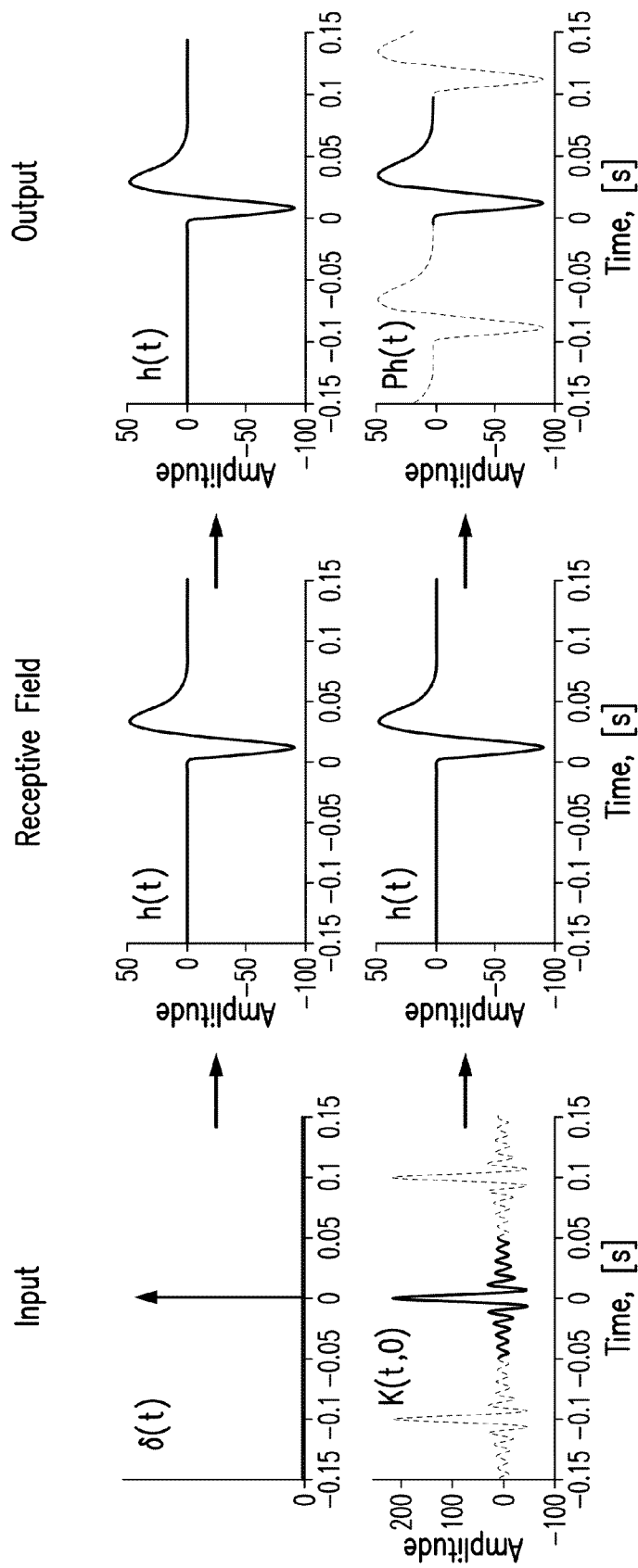
FIG. 2 illustrates an exemplary kernel processor with a single spike provided at the input to an exemplary temporal receptive field of a neuron according to the disclosed subject matter.

FIG. 2 (top row) illustrates a single spike input to a temporal receptive field of a neuron. As shown in FIG. 2, a spike $\delta(t)$ at the input to a temporal receptive field can produce a kernel h at its output. For purpose of comparison, as shown in FIG. 2 (bottom row) the spike can be replaced with an RK $K(t,0) \in \mathcal{H}$, and the receptive field output can be represented as the signal $\mathcal{P}$ h(t), which can approximate the output produced by the spike $\delta(t)$ arbitrarily closely on t∈[0, T].

For purpose of illustration, the above technique can be represented as:

$$v'(t) = K(t, s_k) * h(t) \stackrel{(a)}{=} (Ph)(t - s_k) \stackrel{L^2}{\to} h(t - s_k) \stackrel{(b)}{=} \delta(t - s_k) * h(t) = v(t) \quad (2)$$

where $(a)$ and $(b)$ can illustrate the sampling properties of the RK and the Dirac-delta function, respectively. As illustrated in FIG. 2, if an input spike $\delta(t-s_k)$ is replaced with $K(t, s_k)$, the output v' of the temporal receptive field can converge in the $L^2$ norm (with increasing bandwidth Ω and order L of the space $\mathcal{H}$) to the output v elicited by the spike $\delta(t-s_k)$.

Figure 3C:
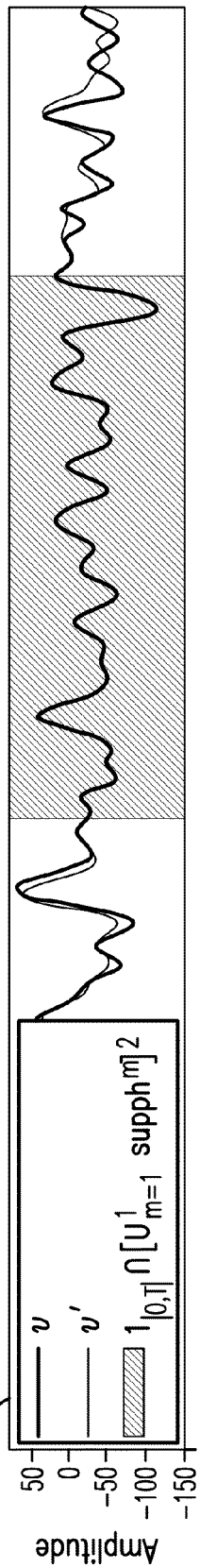
Figure 3D:
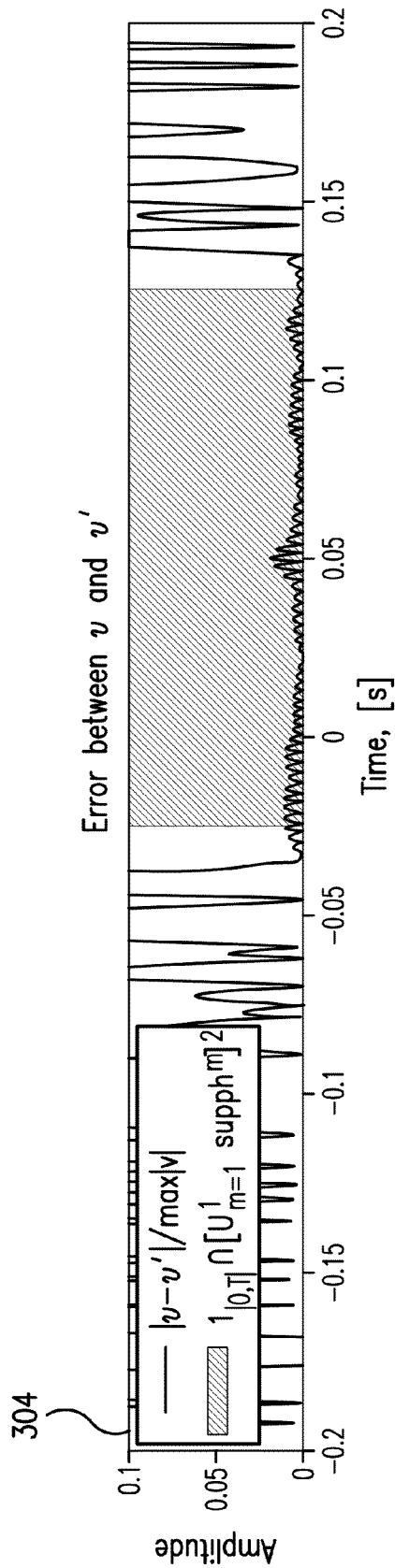

FIG. 3A illustrates three spike trains $s^1, s^2, s^3$, shown in red, green and blue A suitable space $\mathcal{H}$ can be chosen, for example and embodied herein as Ω=2π·160 rad/s and L=40. Parameters of the space can be determined by the spectral and temporal support of the receptive fields as well as by results of the Fourier series. At 301, spikes can be selected from the spike trains in a window of length T, for example and as embodied herein where T=2πL/Ω=0.25 s shown in yellow. At 302, each selected spike $s_k^m$ in can be replaced with the sampled reproducing kernel $K(t, s_k^m)$. In this manner, as illustrated in FIG. 3B, three continuous periodic signals $P_s^1$, $P_s^2$ and $P_s^3$ can be obtained. Furthermore, $Ps^m \in \mathcal{H}$ with $Ps^m = \Sigma_{l=-L}^{L} s_l^m e_l$, where $s_l^m$ can be represented by $s_l^m = \langle P_s^m, e_l \rangle$, m=1, . . . , 3, l=-L, -L+1, . . . , L. At 303, as illustrated in FIG. 3C, the three signals can be passed through the temporal receptive fields $h^m$, m=1, . . . , 3, and an aggregate dendritic current $v' = \Sigma_{m=1}^{M} P_s^m * h^m$ can be produced, which can generally be distinguishable from the true dendritic current $v' = \Sigma_{m=1}^{M} s^m * h^m$ on the interval $[0, T] \cap [\cup supph^m]^c$. FIG. 3D illustrates an amount of error measured between v and v'.

According to another aspect of the disclosed subject matter, the action potential generation can be represented as a wide class of spiking point neuron models, including nonlinear conductance-based models with stable limit cycles (e.g., Hodgkin-Huxley, Fitzhugh-Nagumo, Morris Lecar), as well as the integrate-and-fire (IAF) or the threshold-and-fire neuron model. These models can be extended to incorporate various noise sources in the form of, e.g., random thresholds or stochastic gating variables. Furthermore, the response of such models can generally depend on the initial conditions of the dynamical system.

For purpose of illustration and not limitation, conductance-based neuron models are described herein. For example, and as embodied herein, the Hodgkin-Huxley point neuron model is described. In another exemplary embodiment, the reduced project-integrate-and-fire neuron with conditional phase response curves (reduced PIF-cPRC) is described. This reduced model can be used to accurately capture response properties of many point neuron models, including Hodgkin-Huxley, Morris-Lecar, Fitzhugh-Nagumo and others. Furthermore, as discussed further herein, the reduced PIF-cPRC model can be utilized to characterize the spike generation process of biological neurons when the underlying neuron parameters are not known.

Figure 4:
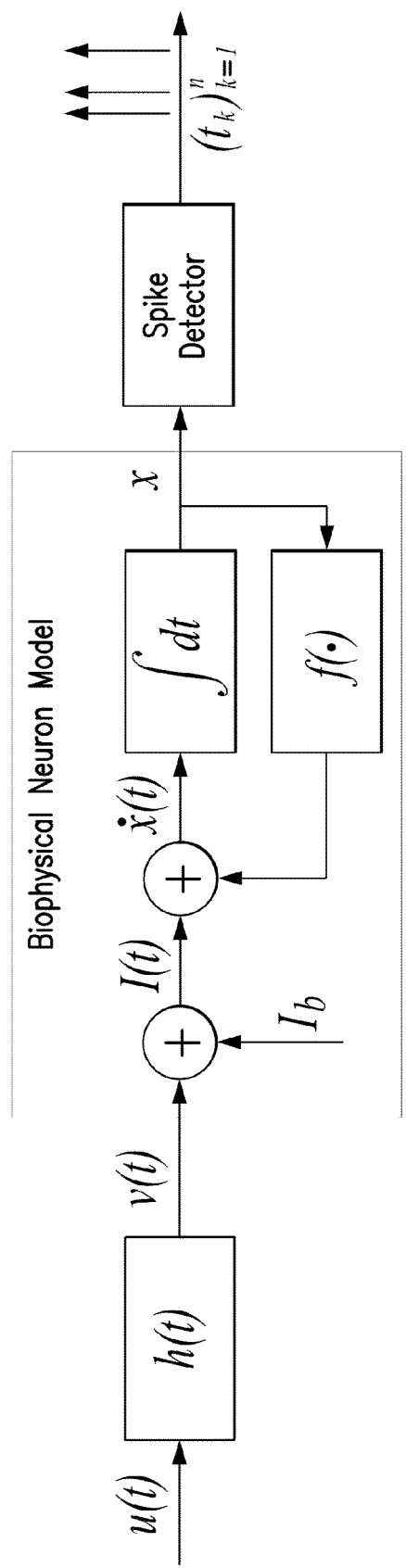
FIG. 4 is a diagram illustrating an exemplary [RF]-[Biophysical Neuron] circuit.

The exemplary point neuron models described herein can be represented by the set of differential equations $$\frac{dx}{dt} = f(x) + [I(t), 0, 0, \ldots, 0]^T, \quad (3)$$

where the vector x can describe the state of the point neuron, $I(t)$, $t \in \mathbb{R}$, can represent the aggregate dendritic current and $x^T$ can denote the transpose of x. FIG. 4 illustrates a block diagram of an exemplary biophysical neuron with a single temporal receptive field. The aggregate dendritic current can be of the form $I(t) = v(t) + I_b$, where $I_b$ can represent a constant bias term and $v(t)$ can represent the output of the temporal receptive field with the kernel h processing the continuous input stimulus v, i.e., $v(t) = (v*h)(t)$, $t \in \mathbb{R}$.

For example, the biophysics of action potential generation can be represented as the four differential equations of the Hodgkin-Huxley neuron model $$C\frac{dV}{dt} = I_b - 9Nam^3h(V - E_{N_a}) - 9Kn^4(V - E_k) - 9L(V - E_L) \quad (4)$$

$$\frac{dm}{dt} = \alpha_m(V)(1 - m) - \beta_m(V)m$$

$$\frac{dh}{dt} = \alpha_h(V)(1 - m) - \beta_h(V)h$$

$$\frac{dn}{dt} = \alpha_n(V)(1 - m) - \beta_n(V)n,$$

-continued with $$\alpha_m(V) = 0.1(25-V)\Big/\left(e^{\frac{25-V}{10}}-1\right) \quad \beta_m(V) = 4e^{\frac{-V}{18}}$$

$$\alpha_h(V) = 0.07e^{\frac{25-V}{20}} \quad \beta_h(V) = 1\Big/\left(e^{\frac{30-V}{10}}+1\right)$$

$$\alpha_n(V) = 0.01(10-V)\Big/\left(e^{\frac{10-V}{10}}-1\right) \quad \beta_n(V) = 0.125e^{\frac{-V}{80}},$$

where V can represent the membrane potential, m, h and n can be gating variables and $I_b \in \mathbb{R}_+$ can represent a constant input (bias) current. The original HH equations above can be compactly written as $dx/dt=f(x)$, where $x=[V, m, h, n]^T$ can represent a vector including the membrane voltage and sodium/potassium gating variables, while $f=[f_1, f_2, f_3, f^4]^T$ can represent the corresponding function vector. The sequence of spike times $\{t_k\}_{k \in \mathbb{Z}}$ can be obtained by detecting the peaks of the action potentials of the first component of the vector x, i.e., the membrane potential $x_1=V$.

Using non-linear perturbation analysis, for weak input stimuli the HH neuron (as well as many other conductance-based neuron models) can be represented as a first order input/output (I/O)-equivalent to a reduced project-integrate-and-fire (PIF) neuron. The PIF neuron can be related to the ideal integrate-and-fire (IAF) neuron, with additionally projecting the external input current v(t) onto the phase response curve (PRC) of the neuron:

$$\int_{t_k}^{t_{k+1}} \phi^1(s-t_k)v(s)ds = q_k, \quad (5)$$

where $q_k = \delta - (t_{k+1}-t_k)$ can represent the neuron's phase advance or delay, δ can represent the period of the neuron and $\phi^1(t)$, $t \in [0, t_{k+1}-t_k)$, can represent the PRC on a stable orbit. Eq. (5) can also represent the t-transform of the reduced PIF neuron. PRCs can describe the transient change in the cycle period of the neuron induced by a perturbation as a function of the phase at which that perturbation is received. For multidimensional models such as the Hodgkin-Huxley model, the function $\phi^1$ can represent the first component of the vector-valued PRC $\phi=[\phi^1, \phi^2, \phi^3, \phi^4]^T$, corresponding to the membrane potential V.

Figure 5:
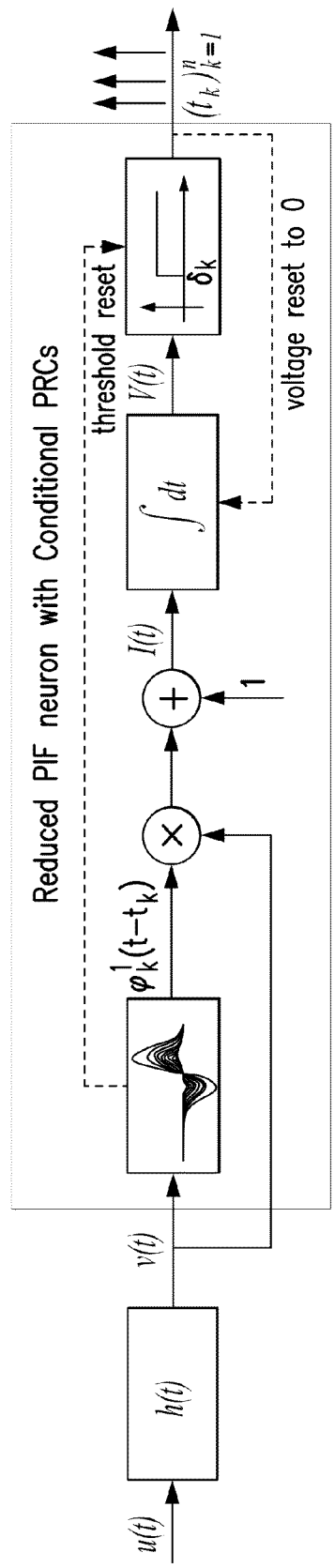
FIG. 5 is a diagram illustrating an exemplary [RF]-Reduced PIF-cPRC neural circuit.

For relatively strong input stimuli that introduce large perturbations into the dynamics of the neuronal response, the behavior of the neuron can be described by the reduced PIF-cPRC neuron, the reduced project-integrate-and-fire neuron with conditional PRCs:

$$\int_{t_k}^{t_{k+1}} \phi^1(s-t_k)v(s)ds = q_k, \quad (6)$$

where $q_k = \delta_k - (t_{k+1}-t_k)$ with $\delta_k$ corresponding to the PRC $\phi_k^1$. In this model, the phase response curve is typically not frozen but can be conditioned on the input signal, as illustrated in FIG. 5. With reference to FIG. 5, the aggregate current v can be generated by the receptive field, which can be represented as an input to the PRC block. The latter can represent an entire family of PRCs and can produce a PRC $\phi_k^1$ conditioned on v. The receptive field current can be multiplied by the conditional PRC and the resulting signal v(t) $\phi_k^1(t-t_k)$, $t \in [t_k, t_{k+1})$, can be encoded into a sequence of spikes by an integrate-and-fire type model, in which the threshold $\delta_k$ can also be conditioned on the input stimulus via the PRC. The subscript k can illustrate that the PRC $\phi_k^1(t)$ and the threshold $\delta_k$ can change at each spike time, which can depend on the input signal v.

According to another aspect of the disclosed subject matter, techniques for identifying neuron models including receptive fields and spike generators are provided. An exemplary technique, identification of a spike generator (or point neuron) is provided. If parameters of the spike generator are not known, the reduced PIF neuron with conditional PRCs discussed herein can be used to determine a first-order equivalent model. As such, identification of the spike generator can include finding a family of PRCs.

As embodied herein, techniques for estimating PRCs do not require knowing parameters of the dynamical system or delivering pulses of current at different phases of the oscillation cycle. Rather, exemplary techniques include injecting a random current waveform and estimating the PRC from the information contained in the spike train at the output of the neuron. Furthermore, exemplary technique described herein do not use white noise stimuli and can provide strong insight into how the perturbation signal effects the estimated PRC. As embodied herein, if the bandwidth of the injected current is not taken into account, the estimated PRC can be substantially different from the underlying PRC of the neuron.

For purpose of illustration, a point neuron model on a stable limit cycle with a period δ that can be generated by an input bias current $I_b$=const. A weak random input signal u(t), $t \in \mathbb{R}$ can be provided, and the response of the point neuron can be captured by the reduced PIF neuron Eq. (6), which can be represented as $\int_{t_k}^{t_{k+1}} \phi^1(t-t_k)u(t)dt = q_k$. For $u \in \mathcal{H}$ with a period $T=2\pi L/\Omega$, $$\int_0^{t_{k+1}-t_k} \phi^1(t)u(t+t_k) = \int_0^{t_{k+1}-t_k} \phi_1(t) \int_0^T u(s)$$
$$\overline{K(s,t+t_k)}dsdt = \int_0^T u(s) \int_0^{t_{k+1}-t_k} \phi^1(t) \overline{K(t),s-t_k)}$$
$$dtds \stackrel{(*)}{=} \int_0^T u(s) P\phi^1(s-t_k)ds, \quad (7)$$

where $P\phi^1 \in \mathcal{H}$ can represent the PRC projection onto $\mathcal{H}$ and (*) holds, for example where $t_{k+1}-t_k \leq T$, and generally $\phi^1(t)=0$ for $t > t_{k+1}-t_k$ for certain neurons, including the Hodgkin-Huxley neuron. The inequality $t_{k+1}-t_k \leq T$ can be satisfied by an appropriate choice of the space $\mathcal{H}$.

By the Riesz representation theorem, the right hand side of Eq. (7) can be represented as a linear functional and $$\int_0^T u(s)P\phi^1(s-t_k)ds = L(P\phi^1) = \langle P\phi^1, \phi_k \rangle,$$

where $\phi_k \in \mathcal{H}$. As such, spikes time perturbations due at least in part to the weak random input $u \in \mathcal{H}$ can be interpreted as measurements of the projection $P\phi^1$. $P\phi^1$ can be reconstructed from these measurements, as discussed further below.

For example, $$\{u^i \mid u^i \in \mathcal{H}\}_{i=1}^N$$

can be a collection of N linearly independent weak currents perturbing the Hodgkin Huxley neuron on a stable limit cycle with a period $\delta_k$. The total number of spikes $n = \sum_{i=1}^N n^i$ generated by the neuron can satisfy $n \geq 2L+N+1$, and the PRC projection $P\phi^1$ can be identified from a collection of I/O pairs $$\{(u^i, T^i)\}_{i=1}^N$$

as $$(P\varphi^1)(t) = \sum_{l=-L}^{L} \psi_l \ell_l(t), \quad (8)$$

where $\Psi_l = [\Psi]_l$, $l=-L+1, \ldots, L$, and $\Psi = \Phi + q$. Furthermore, $\Phi = [\Phi^1; \Phi^2; \ldots; \Phi^N]$, $q = [q^1; q^2; \ldots; q^N]$ and $[q^i]_k = q_k^i$ with each $\Phi^i$ of size $(n^i-1) \times (2L+1)$ and $q^i$ of size $(n^i-1) \times 1$. The elements of matrices $\Phi^i$ can be represented as $$[\Phi^i]_{kl} = \frac{1}{\sqrt{T}} \left[ \sum_{m=-L, m \neq -1}^{L} \frac{u_m^i L[e_{l+m}(t_{k+1}^i) - e_{l+m}(t_k^i)]}{j(l+m)\Omega} + u_{-1}^i(t_{k+1}^i - t_k^i) \right] \quad (9)$$

for all k=1, 2, . . . , n−1, 1=−L, −L+1, . . . , L, and i=1, 2, . . . , N.

P$\phi^1$∈H, and thus can be written as (P$\phi^1$)(t)=$\Sigma_{l=-L}^{L}\Psi_l e_l$(t). Furthermore, the stimuli can be linearly independent, and the measurements $(q_k^i)_{k=1}^{n^i-1}$ provided by the PIF neuron can be distinct. Eq. (7) can be written for a stimulus $u^i$, and as such $$q_k^i = \langle Pt^i, \phi_k^i \rangle = \sum_{l=-L}^{L} \psi_l \overline{\phi_{l,k}^i}, \quad (10)$$

or $q^i=\Phi^i\Psi$, with $[q^i]_k=q_k^i$, $[\Phi^i]_{kl}=\overline{\phi_{l,k}^i}$ and $[\Psi_l=\Psi_l]$. This can be repeated for all i=1, . . . , N, and thus $q^i=\Phi\Psi$ with $\Phi=[\Phi^1; \Phi^2; . . . ; \Phi^N]$, and q=$[q^1; q^2; . . . ; q^N]$. This system of linear equations can be solved for $\Psi$, for example where the rank r($\Phi$) of the matrix $\Phi$ is r($\Phi$)=2L+1. Furthermore, the total number n=$\Sigma_{i=1}^{N} n^i$ of spikes generated in response to all N signals can satisfy n≥2L+N+1. As such, the solution can be determined by $\Psi=\Phi^+q$. Additionally, the coefficients $\overline{\phi_{l,k}^i}$, can be represented as $\phi_{l,k}^i=\overline{L_k^i(e_l)}$.

The result above illustrates that the PRC projection $\rho_{\phi^1}$ can be recovered from the recorded spike train. Note that $\rho_{\phi^1}$ can be represented by the projection of the PRC$_{\phi^1}$ onto the space of stimuli $\mathcal{H}$ and can generally be different from the underlying PRC. In practice, H can be determined by a choice of stimuli of the system. The bandwidth of the electrode/neuron seal can be a factor in the PRC estimate.

The random current waveforms $$\{u^1\}_{l=1}^{N}$$

can be delivered either in separate increments or in a single trial. The effects of a perturbation can last longer than a single cycle, and as such each current waveform can be followed by a quiescent period, for example to ensure that one perturbation does not influence the neuronal response to another perturbation. The resulting "spike-triggered random injected current waveform" protocol can reduce interactions between consecutive current waveforms and can allow for efficient measurement of the PRC projection P$_{\phi^1}$.

Figure 6A:
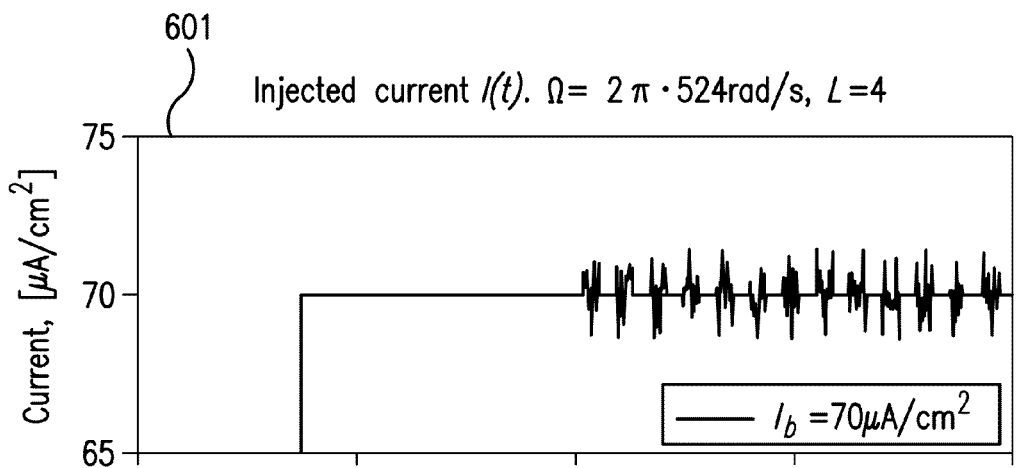
FIGS. 6A-6E are diagrams illustrating an exemplary technique for identification of neural circuits according to the disclosed subject matter
Figure 6B:
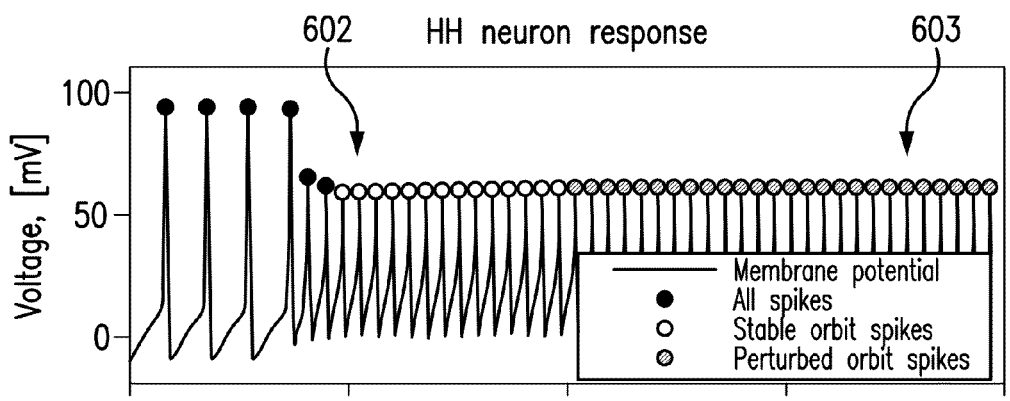
Figure 6C:
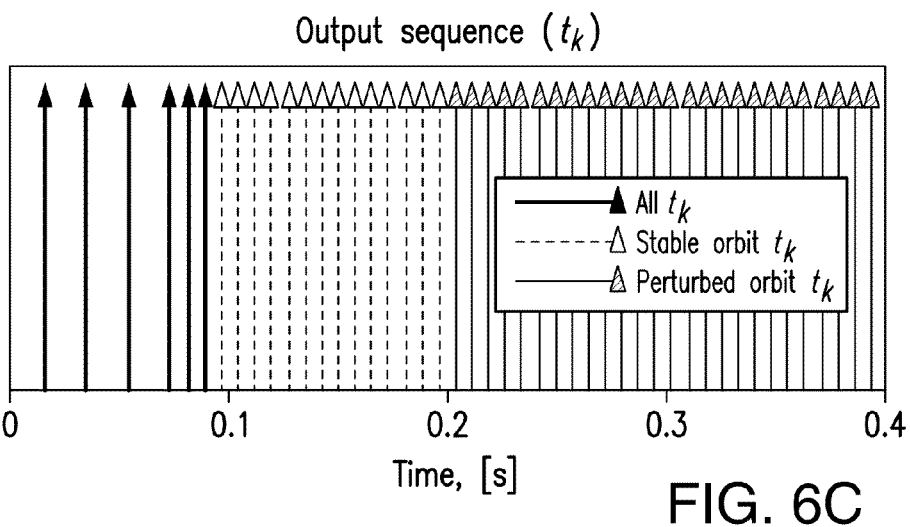
Figure 6D:
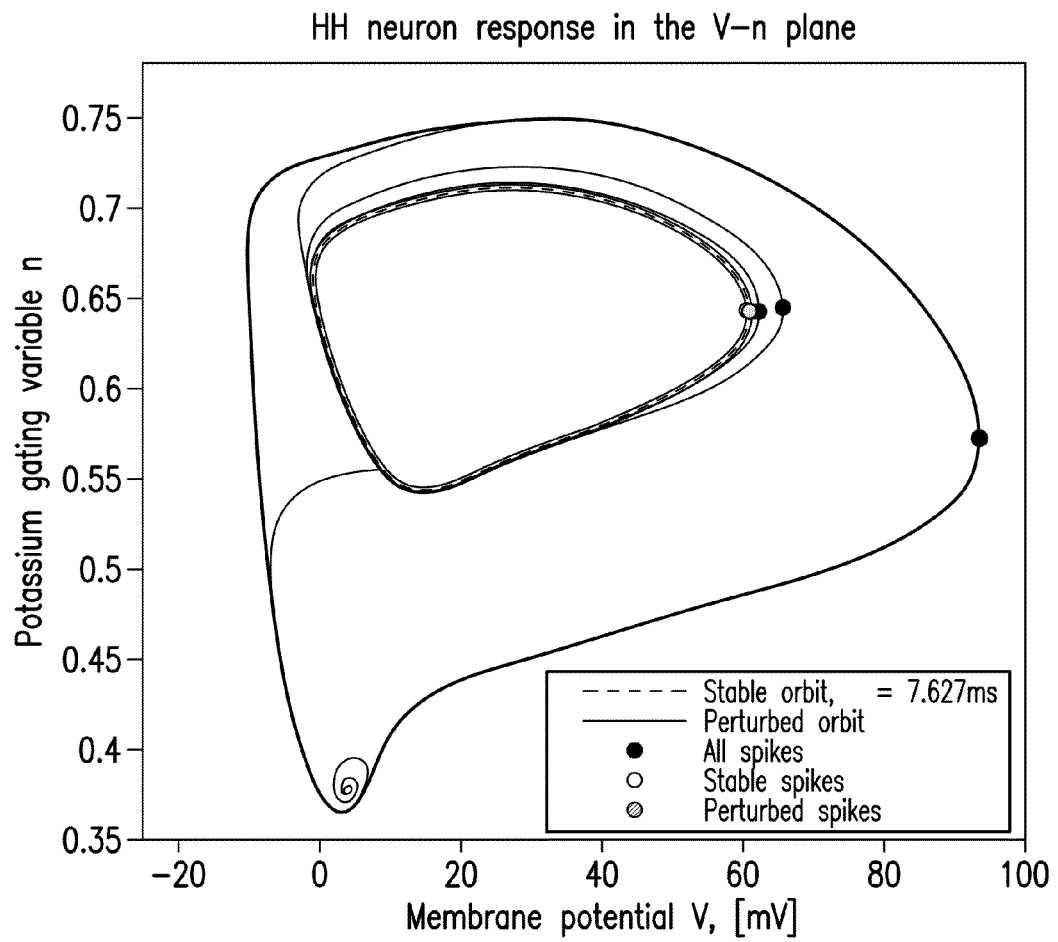
Figure 6E:
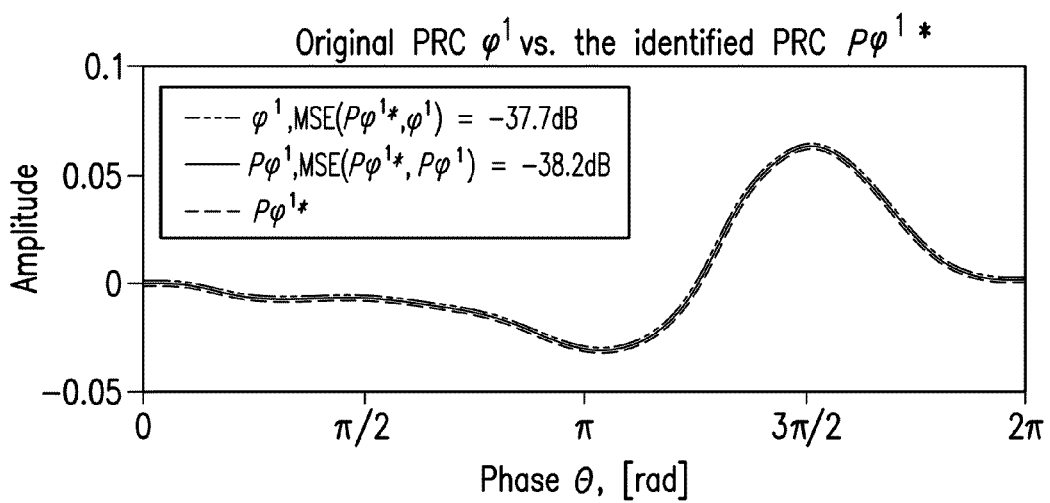

An exemplary technique for PRC identification and the performance thereof for a Hodgkin-Huxley neuron are illustrated in FIGS. 6A-6E. At 601, a bias current $I_b$=70 μA/cm² can be injected into the neuron (FIG. 6A) and can place the state of the neuron onto a stable limit cycle. The period of the oscillation δ on the limit cycle can be computed by recording 'stable spikes', which, at 602, can be produced in response to the constant current, as shown in FIG. 6B. At 603, a sequence of random current waveforms with bandwidth $\Omega$=2π·524 rad/s and order L=4 (FIG. 6A) can be injected into the neuron and the 'perturbed spikes' (FIG. 6B) can be recorded. As embodied herein, the waveforms can be delivered at every other spike to minimize the effect of one perturbation on the neuronal response to a subsequent perturbation, as discussed herein. FIG. 6D illustrates the perturbation experienced by the dynamical system, in which the Hodgkin-Huxley neuron response is illustrated in a two dimensional V-n phase-plane diagram. The stable limit cycle produced by the current $I_b$ and the perturbed trajectory around that limit cycle are illustrated in FIG. 6D. The oscillation period on the stable limit cycle was found to be δ=7.627 ms. Using δ together with the injected current waveforms and produced spike times (shown in FIG. 6C), the PRC projection P$_\phi^1$ can be identified and plotted together with the theoretical value of the projection P$_\phi^1$ and the underlying PRC$_l^1$, as illustrated in FIG. 6D. FIG. 6E illustrates the original PRC$_\phi^1$, its projection P$_\phi^1$ (Eq. (8))) onto the input current space and the identified PRC P$_\phi^{1*}$, respectively. As shown in FIG. 6E, the three waveforms have similar values.

Figure 7:
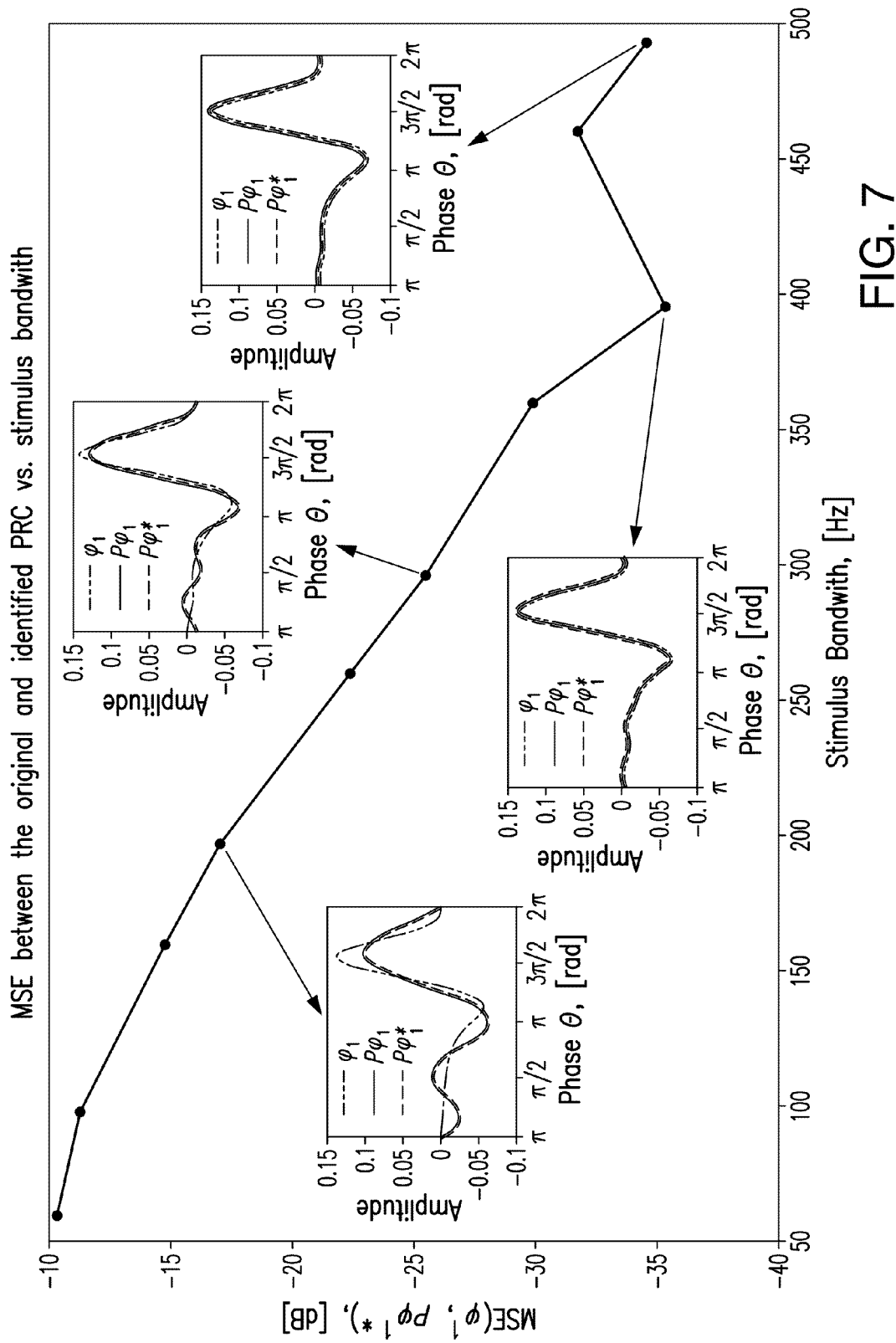
FIG. 7 is a diagram illustrating additional features of the exemplary technique of FIGS. 6A-6E.

For purpose of illustration, FIG. 7 shows a mean-squared error (in decibels) between the original PRC and identified PRC. The identification error can decrease with increasing bandwidth and can proceed to level off, which can provide a measurement of the PRC bandwidth. In practice, different results can be obtained in day-to-day experiments due at least in part to the variability in electrodes, and different types of electrodes used can yield different estimates.

In the exemplary technique, as embodied herein, the bandwidth of the stimulus was $\Omega$=2π·524 rad/s and the PRC$_l^1$ was identified with a very high precision. However, the projection PRC$_l^1$ can be stimulus (i.e., bandwidth) dependent. This dependency is shown in FIG. 7, where the mean-squared error between the identified PRC projection PRC$_l^{1*}$ and the original PRC$_l^1$ as a function of the stimulus bandwidth $\Omega$ is illustrated. Several identification examples are shown as insets in the plot. The identified functions in the first two examples, as illustrated, are different from the PRC estimated in FIG. 6D.

Figure 8A:
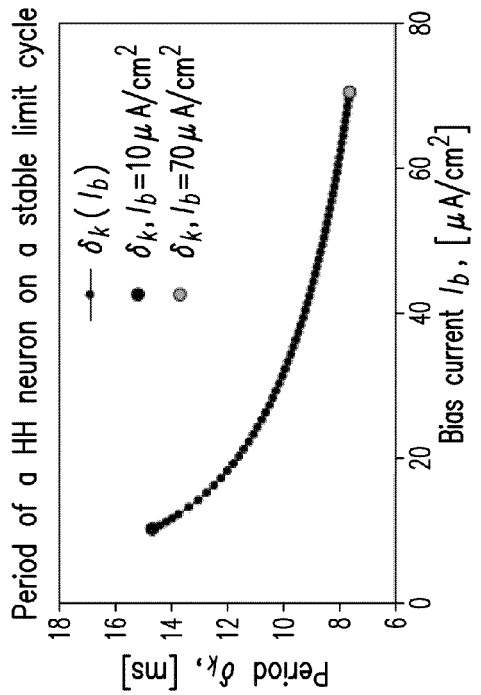
FIGS. 8A-8D are diagrams illustrating further examples of the exemplary technique of FIGS. 6A-6E.
Figure 8B:
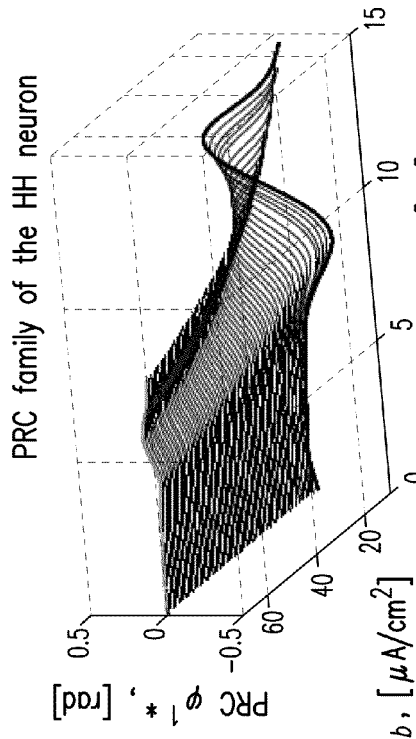
Figure 8C:
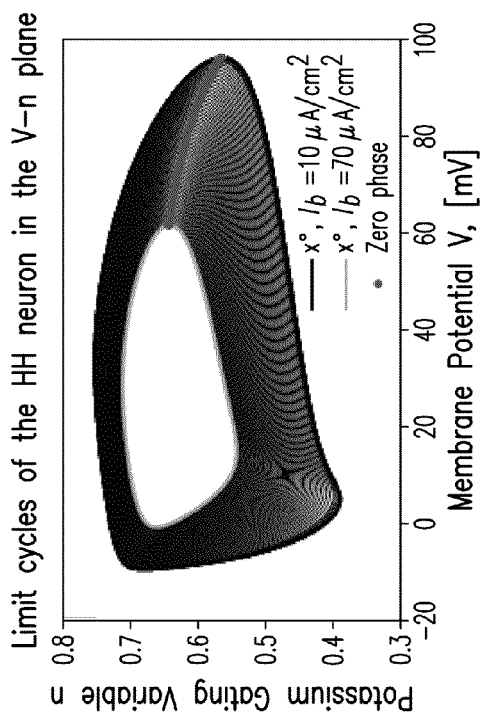
Figure 8D:
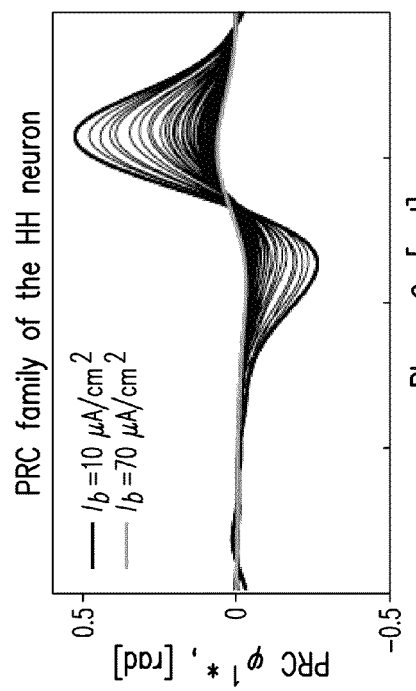

In another example, an entire family of PRCs estimated using the above method for 63 different limit cycles is shown in FIGS. 8A-8D. With reference to FIG. 8A, as the input bias current $I_b$ increases, the limit cycle xo of the neuron shrinks in the V-n plane. As shown in FIG. 8B, the period of the oscillation $\delta_k$ decreases from 17.2 ms to 7.6 ms. As such, the temporal support of each PRC decreases, as shown in FIG. 8D, and thus higher-bandwidth currents can be utilized for estimating the underlying PRC at high spike rates. The entire family of PRCs as a function of phase θ∈[0, 2π] and time t ∈[0, $\delta_k$] is illustrated in FIG. 8C and FIG. 8D, respectively.

According to another aspect of the disclosed subject matter, techniques for identifying a bank of spike-processing temporal receptive fields using multiple windows are provided.

For example, $\{s^1\}_{i=1}^{N}$ can represent a collection of N spike train M-tuples, collected from N windows, at the input of an IAF neuron with M temporal receptive fields represented as $h^m$∈H, m=1, . . . , M, and $(t_k^i)_{k∈\mathbb{Z}}$, i=1, . . . , N, can represent the sequence of spikes produced by the neuron. A space $\mathcal{H}$ with T≥S can have sufficiently high order L and bandwidth $\Omega$, as discussed herein, and the filter projections Ph$^m$ can be identified with arbitrary precision from a collection of input and output spike trains, as represented by $\{s^i\}_{i=1}^{N}$ and $\{t^i\}_{i=1}^{N}$ as (Ph$^m$)(t)=$\Sigma_{l=-L}^{L} h_l^m e_l$(t), m=1, . . . , M. The coefficients $h_l^m$ can be represented as h=$\Phi^+$q with q=$[q^1, q^2, . . . , q^N]^T$, $[q^i]_k=q_k^i$ and h=$[h_{-L}^1, . . . , h_L^1, . . . , h_{-L}^2, . . . , h_L^2, . . . , h_{-L}^M, . . . , h_L^M]^T$, for example with the matrix $\Phi$ having a rank r($\Phi$)=M(2L+1). The $i^{th}$ row of matrix $\Phi$ can be represented as $[\Phi^{i1}, \Phi^{i2}, . . . , \Phi^{iM}]$, i=1, . . . , N, with $$[\Phi^{im}]_{kl} = \sqrt{T} \int_{t_k^i}^{t_{k+1}^i} s_l^{im} e_l(t) dt,$$

where $s_l^{im}$=$\langle P_s^{im}, e_l \rangle$ and the column index 1=−L, . . . , L.

$\mathcal{P} h^m \epsilon \mathcal{H}$, can be represented as $(Ph^m)(t)=\sum_{l=-L}^{L} h_l^m e_l(t)$. As such, for the $m^{th}$ component of the spike-train M-tuple $Ps^i$, $(Ps^{im})*h^m)(t)=\sqrt{T}\sum_{l=-L}^{L} h_l^m s_l^{im} e_l(t)$ and $v^i(t)=\sum_{l=-L}^{L} h_l^m s_l^{im} e_l(t)$ with $v^i \epsilon \mathcal{H}$. The last expression can be substituted into the t-transformation of eq. (1) and can be represented as $$q_k^i \overset{(a)}{=} \langle v^i, \phi_k^i \rangle = \sum_{m=1}^{L}\sum_{l=-L}^{L} \sqrt{T}\, h_l^m s_l^{im} \overline{\phi_{l,k}^i},$$

where $^{(a)}$ can be determined from the Riesz representation theorem with $\phi_k^i = \sum_{l=-L}^{L} \phi_{l,k}^i e_l(t)$. In matrix form, $q_i = [\Phi^{i1}, \Phi^{i2}, \ldots, \Phi^{iM}]h$ with $h=[h_{-L}^1, \ldots, h_L^1, h_{-L}^2, \ldots, h_L^M]^T$, $[q^i]_k = q_k^i$ and $[\Phi^{im}]_{kl} = \sqrt{T} s_l^{im} \overline{\phi_{l,k}^i}$. This relation can be repeated for all M-tuples and can be represented as $Ps^i$, $i=1,\ldots,N$, $q=\Phi^+ h$. The resulting system of equations can be solved for h, for example with the matrix rank $r(\Phi)=M(2L+1)$. To find the coefficients $\overline{\phi_{l,k}^i}$, we note that $\phi_{l,k}^i = \overline{L_k^i(e_l)}$, with $L_k^i$ given in (1). Hence, the result follows.

For purpose of illustration, the condition $r(\Phi)=M(2L=1)$ can be satisfied, where the neuron can produce a total of at least $M(2L=1)+N$ spikes in all N temporal windows. This condition can be met, for example and without limitation, by increasing the duration NT of the experimental recording.

Figure 9A:
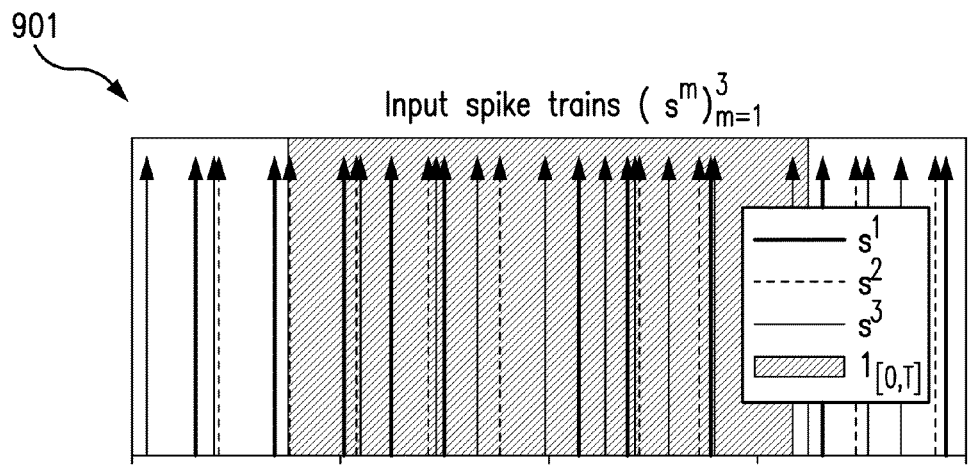
FIGS. 9A-9F illustrate a further exemplary technique for identification of neural circuits according to the disclosed subject matter.
Figure 9B:
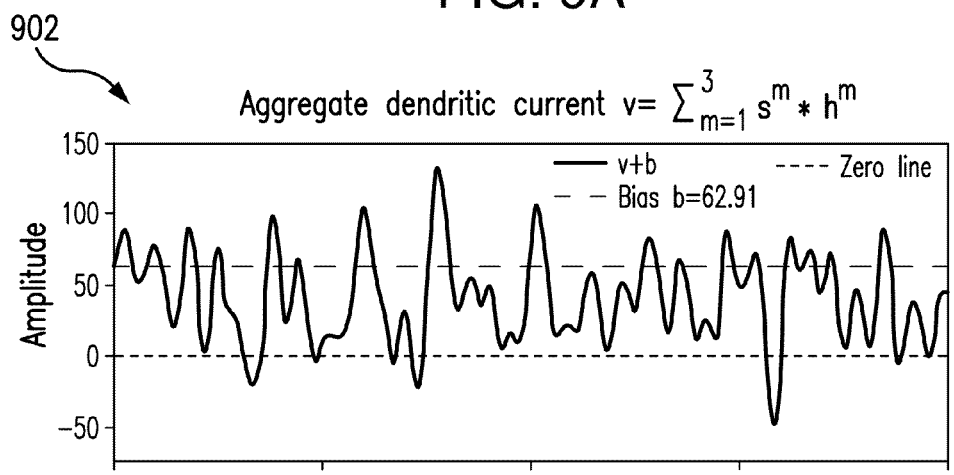
Figure 9C:
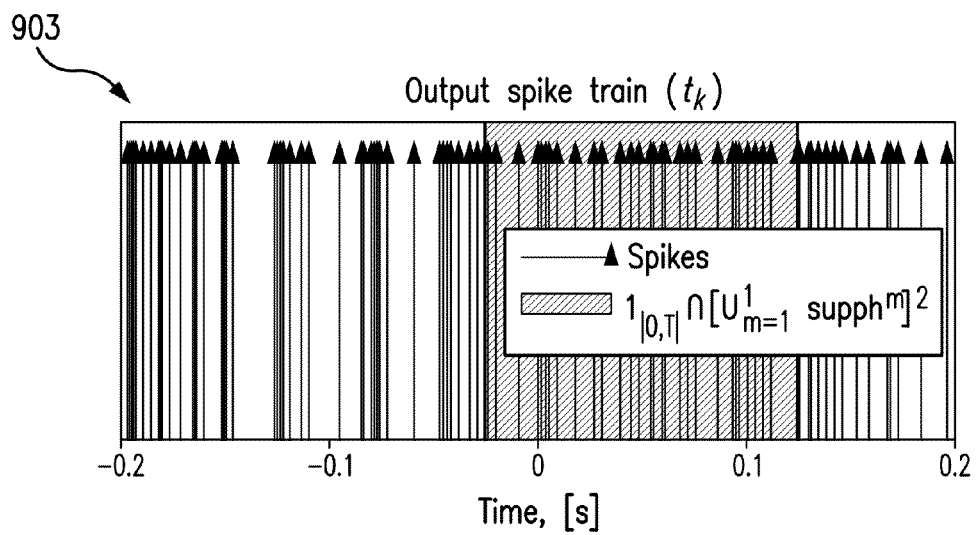
Figure 9D:
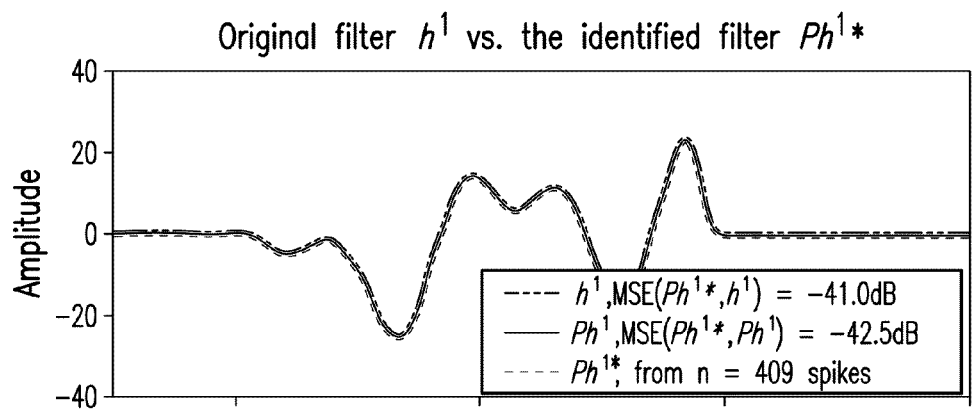
Figure 9E:
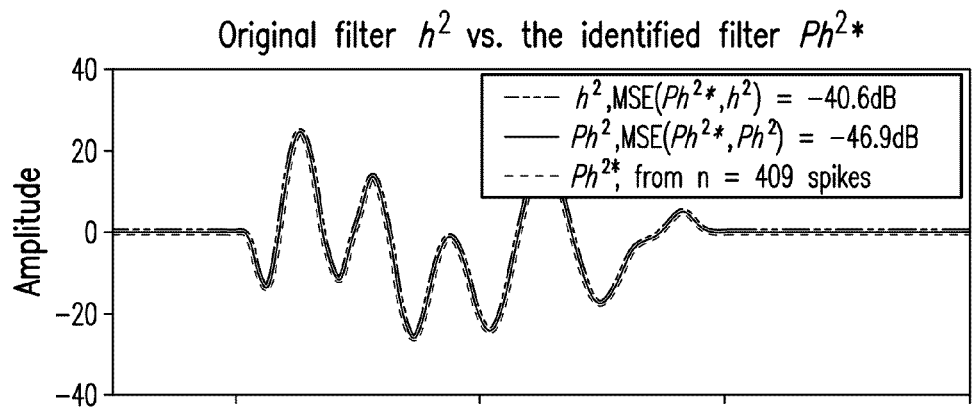
Figure 9F:
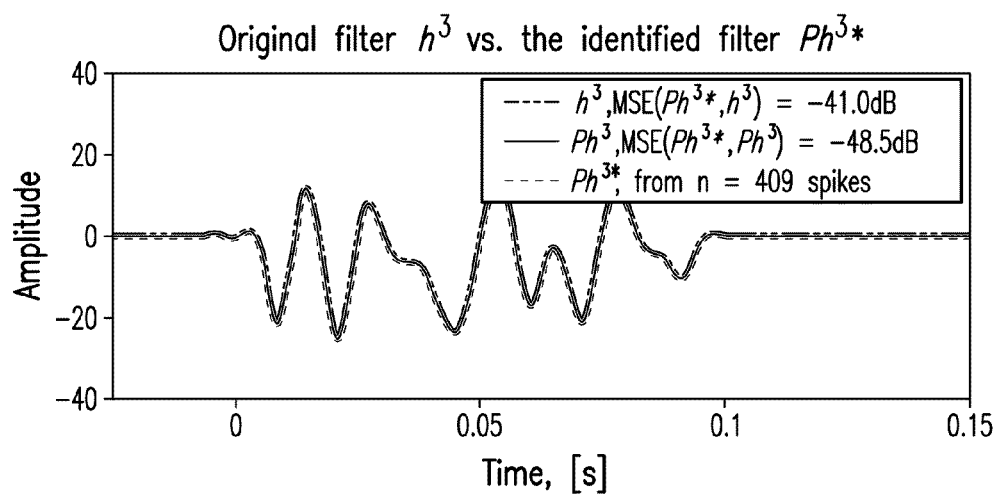

Identification results for the circuit of FIG. 1B are illustrated in FIGS. 9A-9F. Presynaptic spike trains $s_k^1$, $s_k^2$ and $s_k^3$, $k\epsilon Z$, are shown in FIG. 9A. At 901, processing of each spike train can be represented as a temporal receptive field with a kernel $h^m \epsilon H$ having a temporal support $\text{supp}\, h^m \epsilon [0, 0.1]s$, $m=1,\ldots,3$. At 902, as illustrated in FIG. 9B, and at 903, the resulting aggregate dendritic current can be encoded by an IAF neuron into a time sequence $(t_k)_{k\epsilon \mathbb{Z}}$ which is illustrated in FIG. 9C. As embodied herein, input spikes can be projected onto the space $\mathcal{H}$ with $\Omega=160$ and $T=0.25$ s and $N=15$ temporal windows can be utilized. The order of the space is $L=40$, and as discussed herein, at least $M(2L+1)+N=258$ spikes can be utilized to identify kernel projections $Ph^m$, $m=1,\ldots,3$. The identified kernel projections $Ph^{m*}$ can be plotted together with true projections $Ph^m$ and original kernels $h^m$, $m=1,\ldots,3$, as illustrated in FIGS. 9D-9F, respectively. As shown in FIGS. 9D-9F, the three curves in each plot are substantially similar, as the normalized mean-squared error is below −40 dB.

Figure 10A:
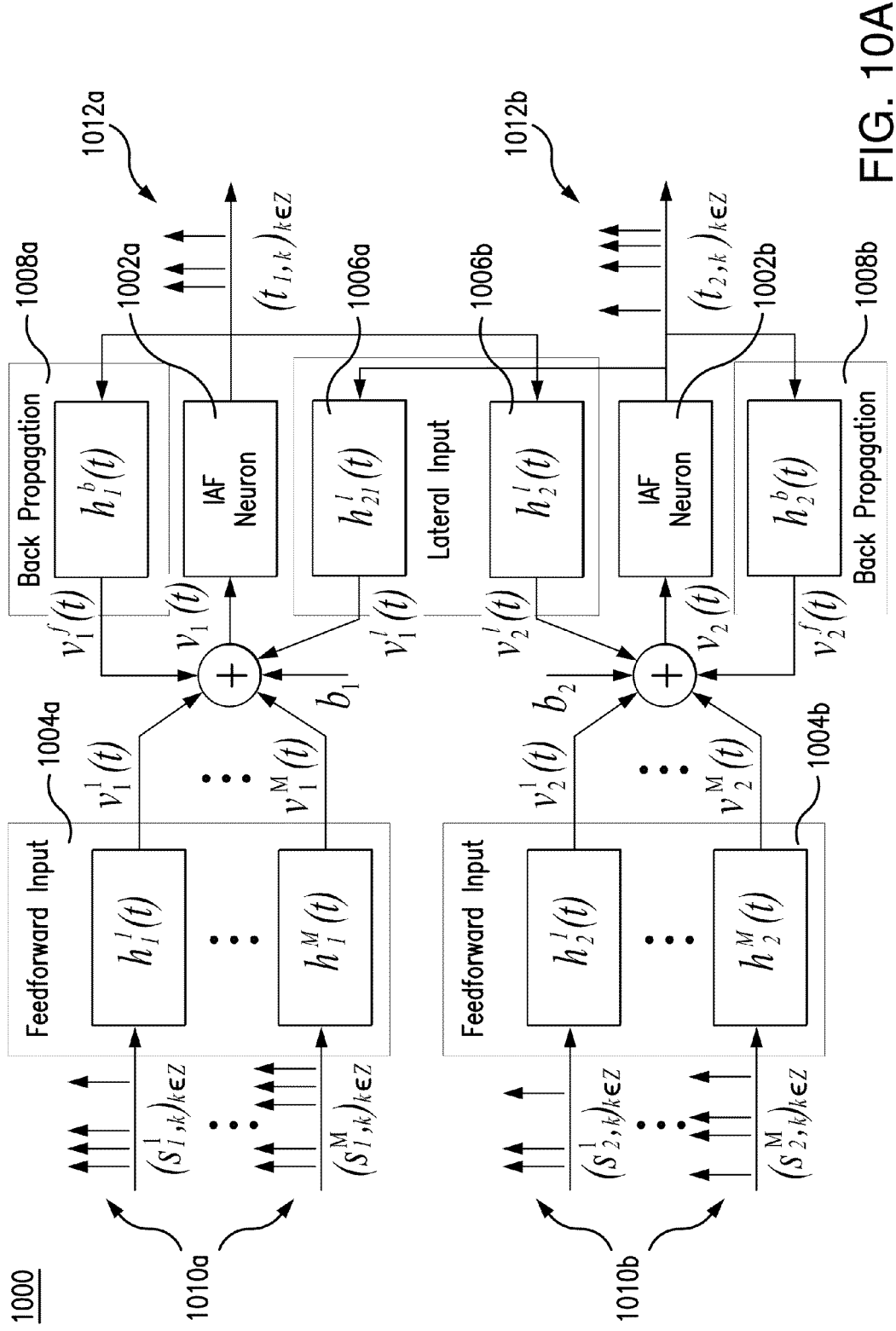
FIG. 10A illustrates a further exemplary neural circuit according to the disclosed subject matter.

According to another aspect of the disclosed subject matter, an exemplary 2-neuron circuit 1000 is provided. As shown in FIG. 10A, each neuron 1002a, 1002b can receive not only a feedforward input 1004a, 1004b from a presynaptic layer, but also a lateral input 1006a, 1006b from another neuron in the same layer. The processing of this spiking lateral input 1006a, 1006b can be described using temporal receptive fields $h_1^l$ and $h_2^l$. In addition, various signals produced by a back-propagating action potential 1008a, 1008b can be modeled, for example and as embodied herein by including the temporal receptive fields $h_1^b$ and $h_2^b$. The present technique can allow biophysical models of spike generation to be considered, as discussed further herein.

An exemplary technique for identifying temporal receptive fields in the circuit of FIG. 10A can be represented as follows. For purpose of illustration, $\{s_j^i\}_{i=1}^{N}$, $j=1,2$, can represent collections of spike train M-tuples 1010a, 1010b at the input of two IAF neurons with feedforward temporal receptive fields represented as $h_j^m$, $\epsilon H$, $m=1,\ldots,M$, as well as lateral and feedback temporal filters $h_j^b$ and $h_j^l$, $j=1,2$. $(t_{1,k})_{k\epsilon Z}$ and $(t_{2,k})_{k\epsilon Z}$ can represent sequences of spikes 1012a, 1012b produced by the two neurons. A space $\mathcal{H}$ and $T\geq S$ and sufficiently high order L and bandwidth $\Omega$ can be provided, as discussed herein, and the filter projections $Ph_j^M$, $Ph_j^l$ and $Ph_j^b$ can be identified with arbitrary precision from a collection of input and output spike trains as $(Ph_j^m)(t)=\sum_{l=-L}^{L} h_{j,l}^m e_l(t)$, $(Ph_j^l)(t)=\sum_{l=-L}^{L} h_{j,l}^l e_l(t)$, $(Ph_j^b)(t)=\sum_{l=-L}^{L} h_{j,l}^b e_l(t)$, $m=1,\ldots,M$, $j=1,2$. As such, the kernel coefficients $h_{j,l}^m$, $h_{j,l}^l$, $h_{j,l}^b$ can be represented as $h=[\Phi_1; \Phi_2]^+ q$ with $q=[q_1^1,\ldots,q_1^N, q_2^1,\ldots,q_2^N]^T$, $[q_j^i]_k = q_{j,k}^i$ and $h=[h_1; h_2]$, where $h_j = [h_{j,-L}^1,\ldots,h_{j,L}^1, h_{j,-L}^2,\ldots,h_{j,L}^2,\ldots,h_{j,-L}^M,\ldots,h_{j,L}^M, h_{j,-L}^l,\ldots,h_{j,L}^l, h_{j,-L}^b,\ldots,h_{j,L}^b]^T$, where each matrix $\Phi_j$, $j=1, 2$ can have a rank $r(\Phi_j)=(M+2)(2L+1)$ The $i^{th}$ row of $\Phi_j$ can be represented as $[\Phi_j^{i1}, \Phi_j^{i2},\ldots,\Phi_j^{iM}, \Phi_j^{il}, \Phi_j^{ib}]$, $i=1,\ldots,N$, with $$[\Phi_j^{ib}]_{kl} = \sqrt{T}\int_{t_{j,k}^i}^{t_{j,k+1}^i} t_{(j\bmod 2)+1,l}^i e_l(t)dt$$

and $$[\Phi_j^{ib}]_{kl} = \sqrt{T}\int_{t_{j,k}^i}^{t_{j,k+1}^i} t_{j,1}^i e_l(t)dt, \; l=-L,\ldots,L.$$

Entries $[\Phi_j^{im}]_{kl}$ can be determined as described herein.

Figure 10B:
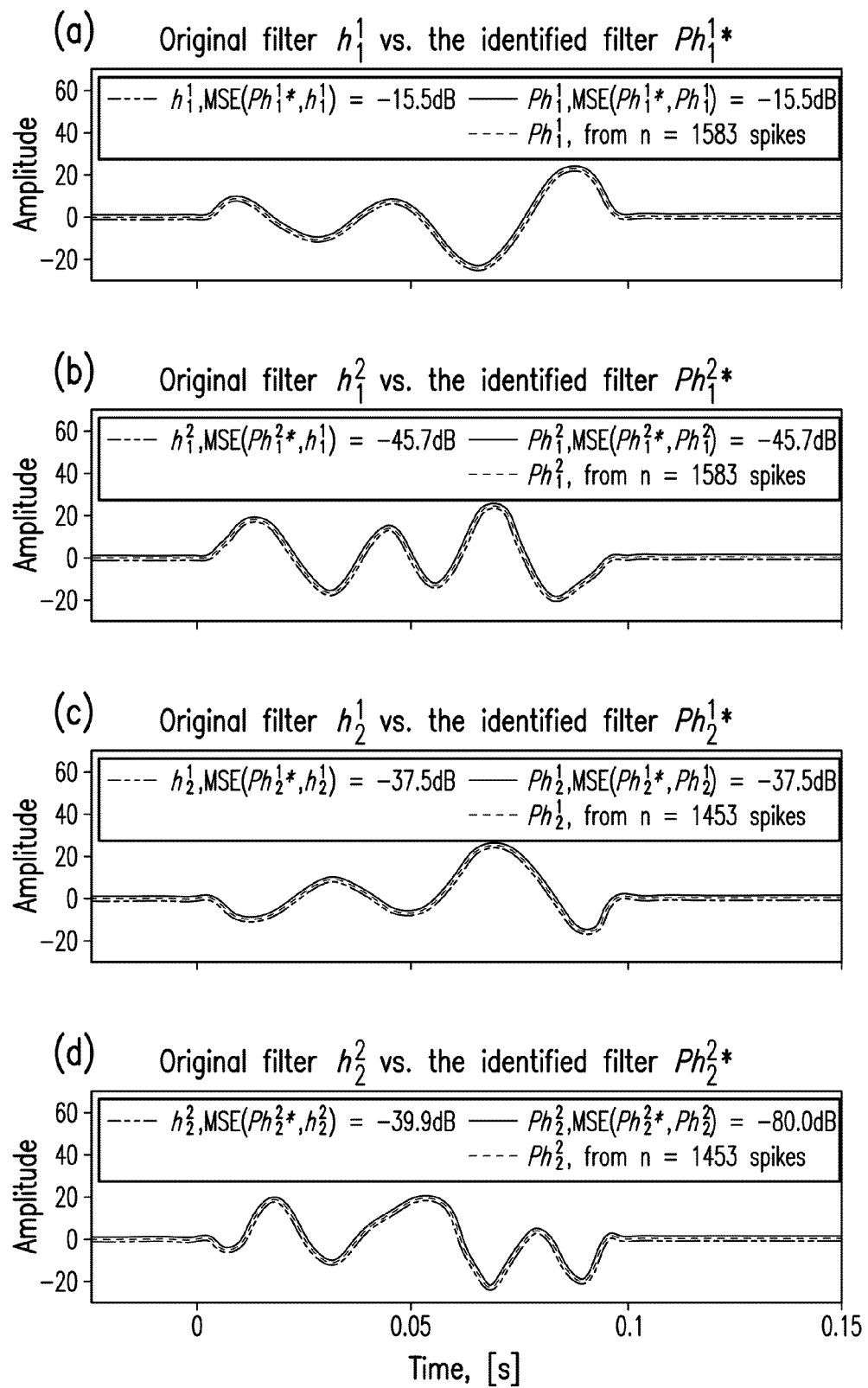
FIG. 10B illustrates a further exemplary technique for identification of neural circuits according to the disclosed subject matter.
Figure 10B:
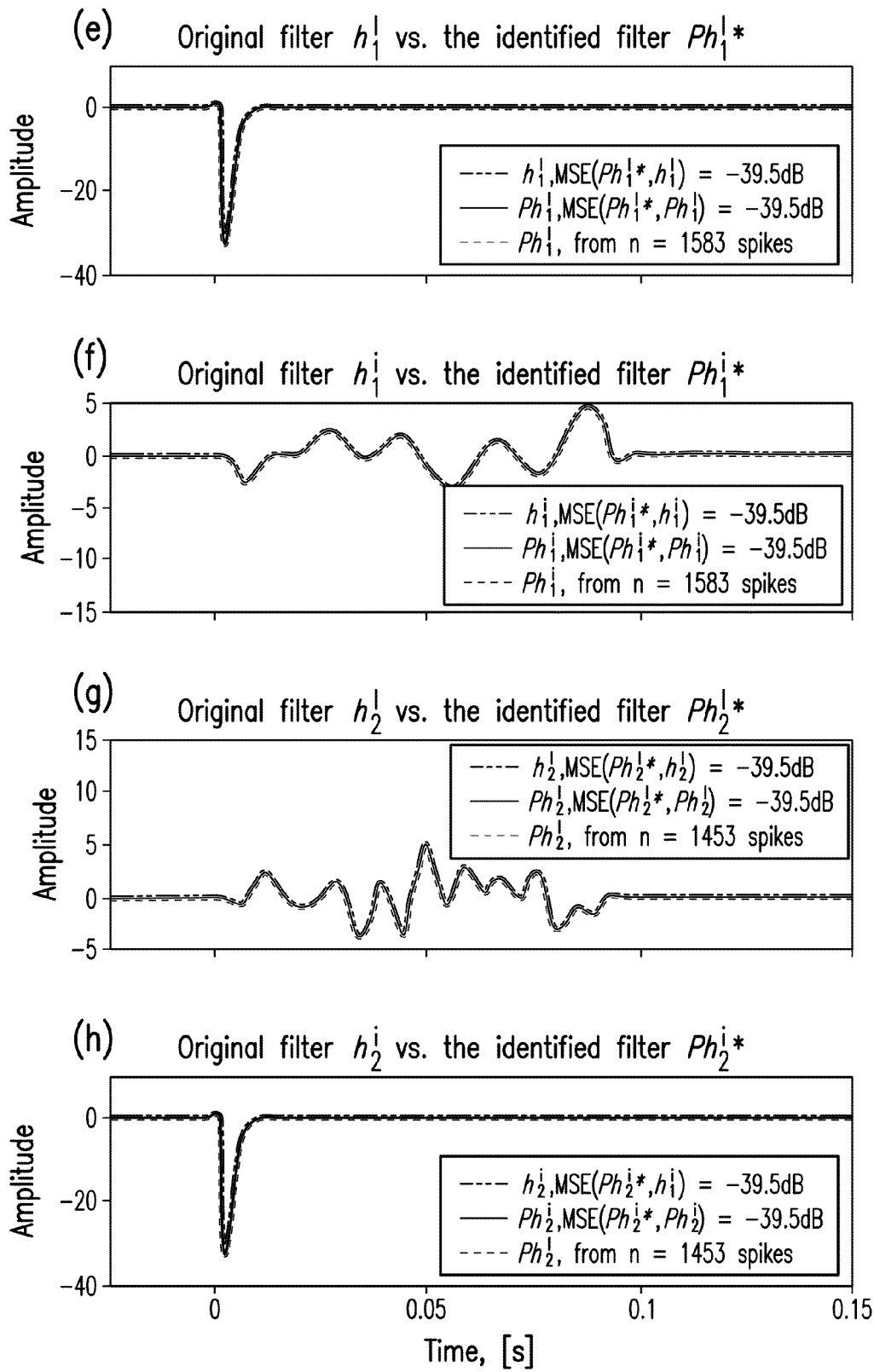

Simulation results demonstrating the performance of the above technique are shown in FIG. 10B. The kernels describing feedforward and lateral receptive fields had a temporal support on the interval [0, 0.1] s, while the rapidly rising feedback kernels were non-zero on the interval [0, 0.015] s and modeled refractory effects. All feedforward input spikes, as well as spikes from lateral and feedback streams were projected onto the space $\mathcal{H}$ with bandwidth $\Omega=2\pi\cdot600$ rad/s, period $T=0.25$ s and order $L=150$. $N=70$ temporal windows were used, for a combined duration of $NT=17.5$ s. Neuron 1 and neuron 2 produced a total of 1,483 and 1,803 spikes, respectively, satisfying the relation $(M+2)(2L+1)+N=1,274$.

The techniques presented herein can be extended in at least three directions. First, more biophysical detail can be introduced and both subthreshold and suprathreshold neuronal events can be modeled, for example and without limitation, by using a conductance-based model of spike generation. Second, certain biological neural circuits receive both spiking and continuous inputs, and such mixed-signal circuits can be modeled. Third, certain models of sensory processing can include receptive fields that are tuned not only to temporal, but also spatial variations in stimuli (for example, in audition, vision).

For purpose of illustration and not limitation, and as embodied herein, the Hodgkin-Huxley (HH) model of action potential generation can be utilized for techniques according to the disclosed subject matter. However, any other nonlinear dynamical system with a stable limit cycle, for example and without limitation, the Fitzhugh-Nagumo or the Morris Lecar model can also be utilized.

The HH equations can be provided as $\dot{x}=f(x)$, where $x=[V, n, m, h]^T$ and $f=[f_1, f_2, f_3, f_4]^T$ can represent the corresponding function vector, with V representing the membrane potential and n, m and h representing the gating variables. The dendritic current $v(t)$, $t\epsilon \mathbb{R}$ can be coupled additively, and the differential equations can assume the form $\dot{x}=f(x)+[v(t), 0, 0, 0]^T$. Non-linear perturbation analysis can be utilized, and as such, for both weak and strong dendritic currents, such a neuron can be represented as a reduced project-integrate-and-fire (PIF) model with conditional phase response curves (cPRCs). The PIF neuron can be considered closely related to the IAF neuron discussed above, with the addition of projecting the current v(t) onto the cPRC of the HH neuron, which can be represented as:

$$\int_{t_k}^{t_{k+1}} \phi_1(t)v(t)dt = q_k, \quad (11)$$

where $q_k = \delta_k - (t_{k+1} - t_k)$ and $\delta_k$ can represent the period of the HH neuron on a stable orbit. The function $\phi_1$ can represent the first component of the cPRC $\phi = [\phi_1, \phi_2, \phi_3, \phi_4]^T$.

Figure 11A:
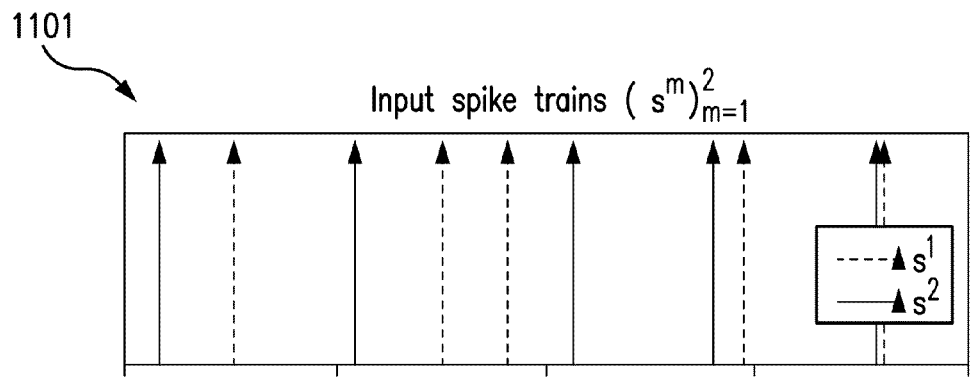
FIGS. 11A-11G illustrate a further exemplary technique for identification of neural circuits according to the disclosed subject matter.
Figure 11B:
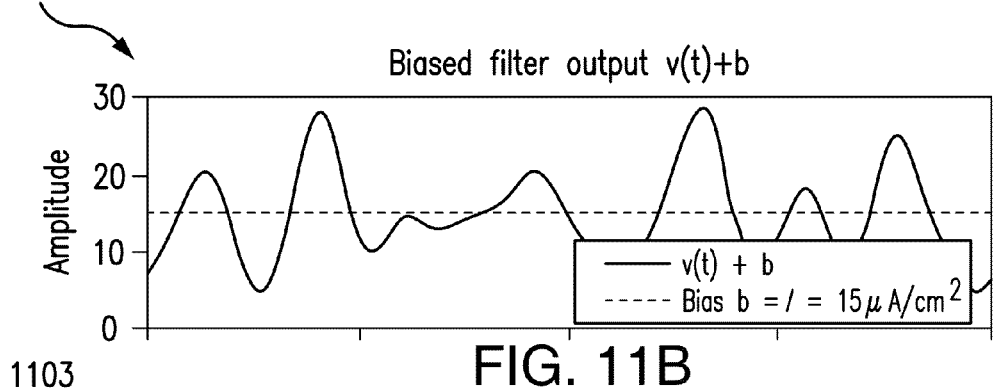
Figure 11C:
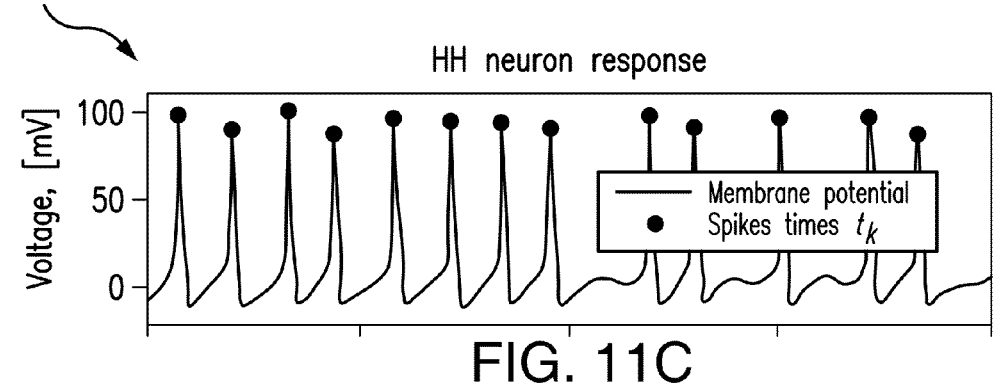
Figure 11D:
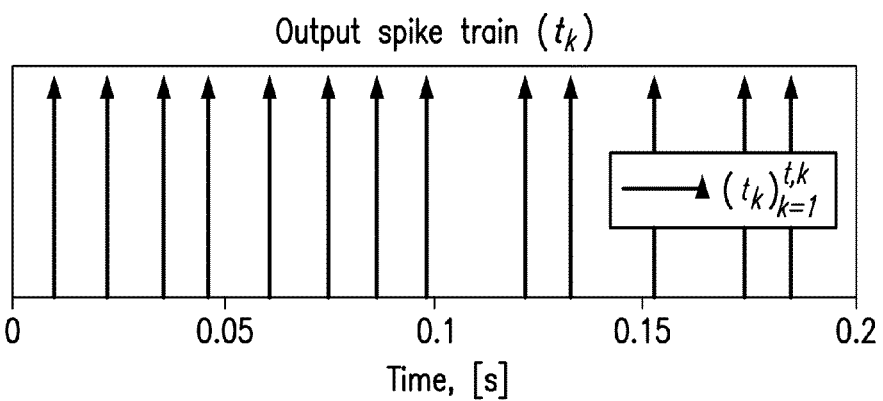
Figure 11E:
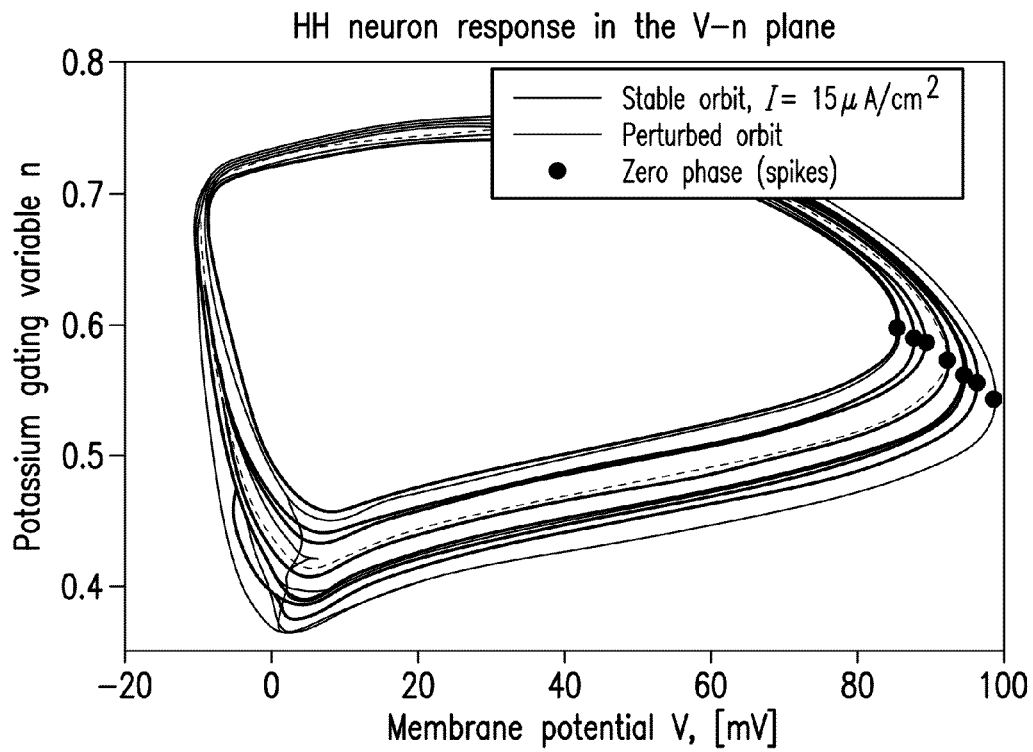
Figure 11F:
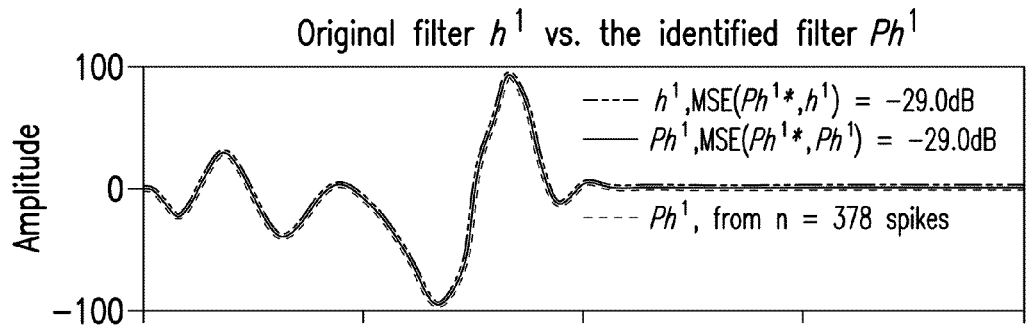
Figure 11G:
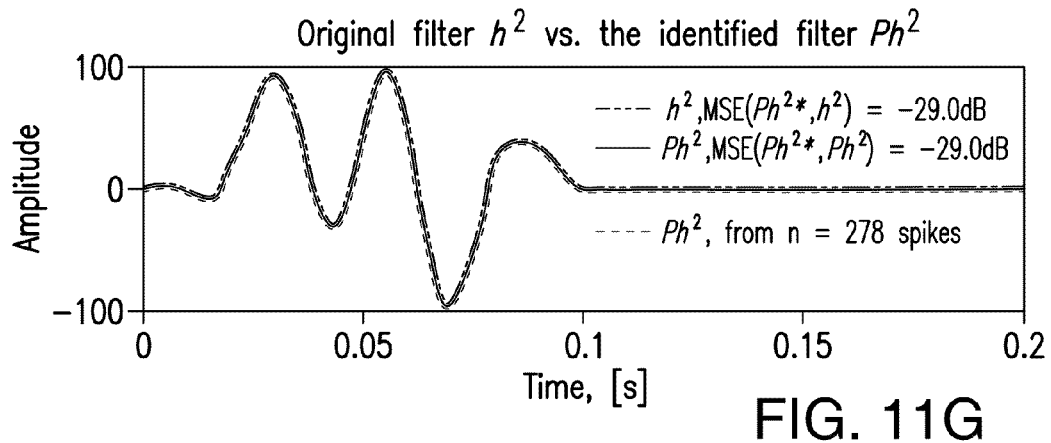

The correspondence between the PIF neuron with cPRCs and the HH neuron can be utilized, and as such the identification techniques presented herein can be applied to neural circuits with biophysical models of action potential generation or other non-biological circuits having nonlinear oscillators with additive or multiplicative coupling (e.g., van der Pol) or asynchronous samplers such as the Asynchronous Sigma Delta Modulator (ASDM). An exemplary application of the identification techniques to neural circuits according to the disclosed subject matter is illustrated in FIGS. 11A-11G. At 1101, as shown in FIG. 11A, a single neuron with two temporal receptive fields $h^1$ and $h^2$ can receive two spiking inputs $s^1$ and $s^2$. At 1102, FIG. 11B illustrates that the aggregate current produced in the dendritic tree can flow into the spike initiation zone, where it can be encoded at 1103 into a sequence of action potentials as a function of time (as shown in FIG. 11C) by the Hodgkin-Huxley model. At 1104, the corresponding sequence of spike times $(t_k)_{k \in \mathbb{Z}}$ as measured, for example and as embodied herein, in extracellular recordings, is illustrated in FIG. 11D. For purpose of illustration, the response of the HH neuron can also be represented in the V–n phase plane, as shown in FIG. 11E. For perturbed orbits of the stable limit cycle shown in FIG. 11E, the techniques described herein can allow for identification of the two dendritic processing filters, that is, temporal receptive fields $h^j$, j=1, 2, as illustrated in FIGS. 11F-11G.

The techniques presented above can also be applied to the circuit in FIG. 10A, where the integrate-and-fire neurons can be replaced with Hodgkin-Huxley neurons.

For certain biological neural circuits, it can be desirable to be able to account for not only the spiking feedforward and lateral inputs, but also various continuous inputs. Such mixed-signal models can be utilized, for example and without limitation, for studying neural circuits having both spiking neurons and neurons that produce graded potentials (for example, the retina), for investigating circuits that have extensive dendro-dendritic connections (for example, the olfactory bulb), and/or for investigating circuits that respond to a neuromodulator (for example, global release of dopamine, acetylcholine, etc.). The latter circuit models can be utilized, for example and without limitation, in studies of memory acquisition and consolidation, sensory processing, central pattern generation, as well as studies of attention and addiction.

According to another aspect of the disclosed subject matter, a continuous signal of interest v(t), $t \in \mathbb{R}$, appearing at the input to a dendritic tree of a neuron, can be modeled as an element of the space of trigonometric polynomials $\mathcal{H}$, which is described in further detail herein. As such, the techniques described herein can be modified to identify the processing of such a signal (or signals), as well as the concurrent processing of any spiking inputs received by the neuron.

In sensory modalities in which the external stimulus can be considered multidimensional (for example, space and time in vision, spectrum and time in audition), the response of many neurons can be described using multidimensional receptive fields. For example and without limitation, spatial and spatiotemporal receptive fields can be used in vision to model retinal ganglion cells in the retina as well as neurons in the lateral geniculate nucleus and the visual cortex. Additionally or alternatively, spectrotemporal receptive fields can be used to describe responses of auditory neurons, neurons in cochlear nuclei and neurons in the auditory cortex.

Figure 12A:
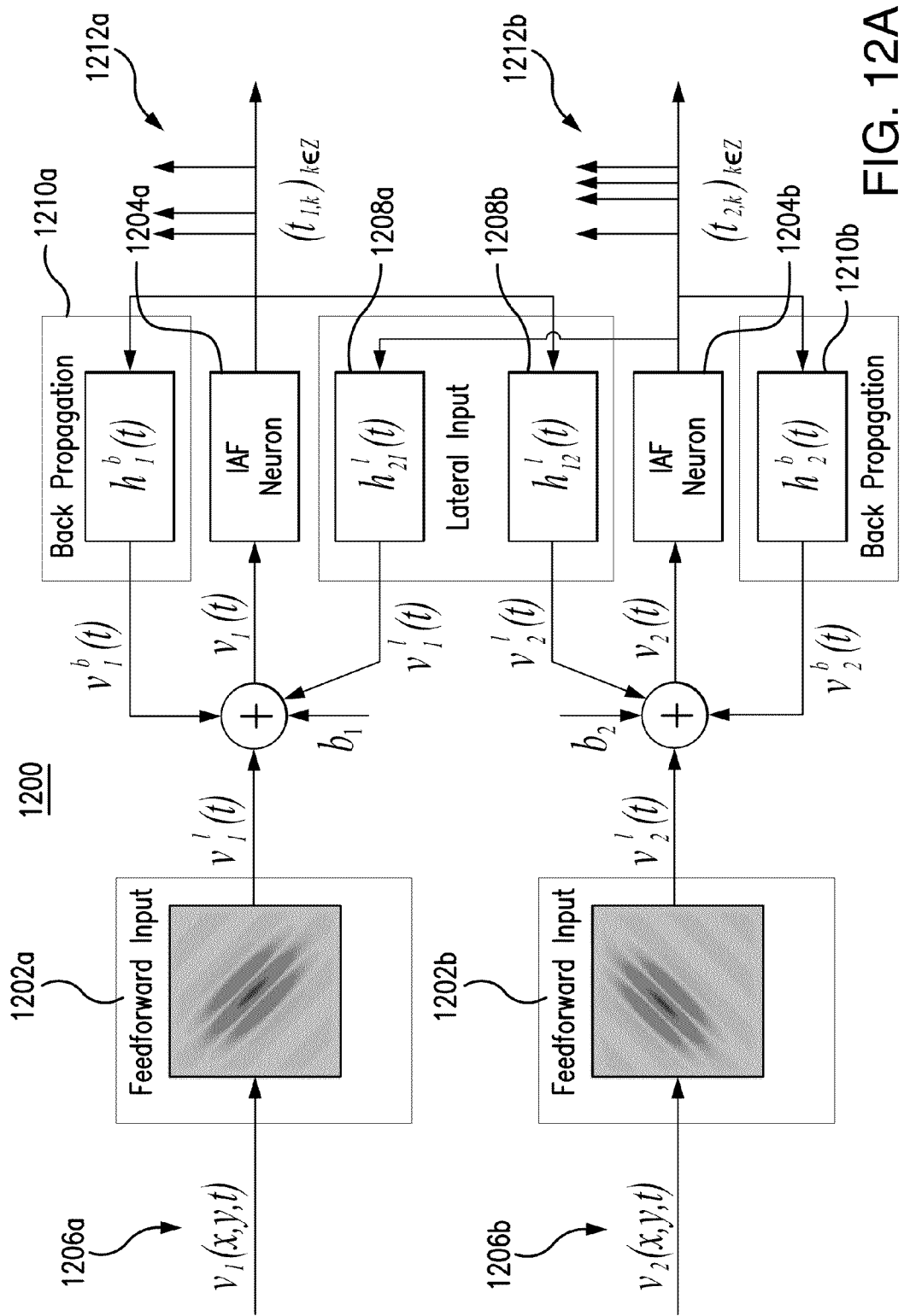
FIG. 12A illustrates a further exemplary neural circuit according to the disclosed subject matter.

The techniques described herein can be extended to such multidimensional feedforward inputs. An exemplary neural circuit 1200 having multidimensional feedforward inputs 1202a, 1202b is illustrated in FIG. 12A. With reference to FIG. 12A, each neuron 1204a, 1204b can process a visual stimulus V(x, y, t) 1206a, 1206b using a distinct spatiotemporal receptive field h(x, y, t). The feedforward dendritic current can thus given by multiplication and summation in the spatial domain and convolution in the time domain, and in this manner can be represented as $v^f(t) = \int_X \int_Y \int_T V(x, y, s)h(x, y, t-s)dsdxdy$. In addition to the external visual input, each neuron can receive a spiking lateral input 1208a, 1208b from another neuron. The back propagation effects can be modeled using a feedback filter 1210a, 1210b. A sequence of spikes 1212a, 1212b can be produced by the neurons.

Figure 12B:
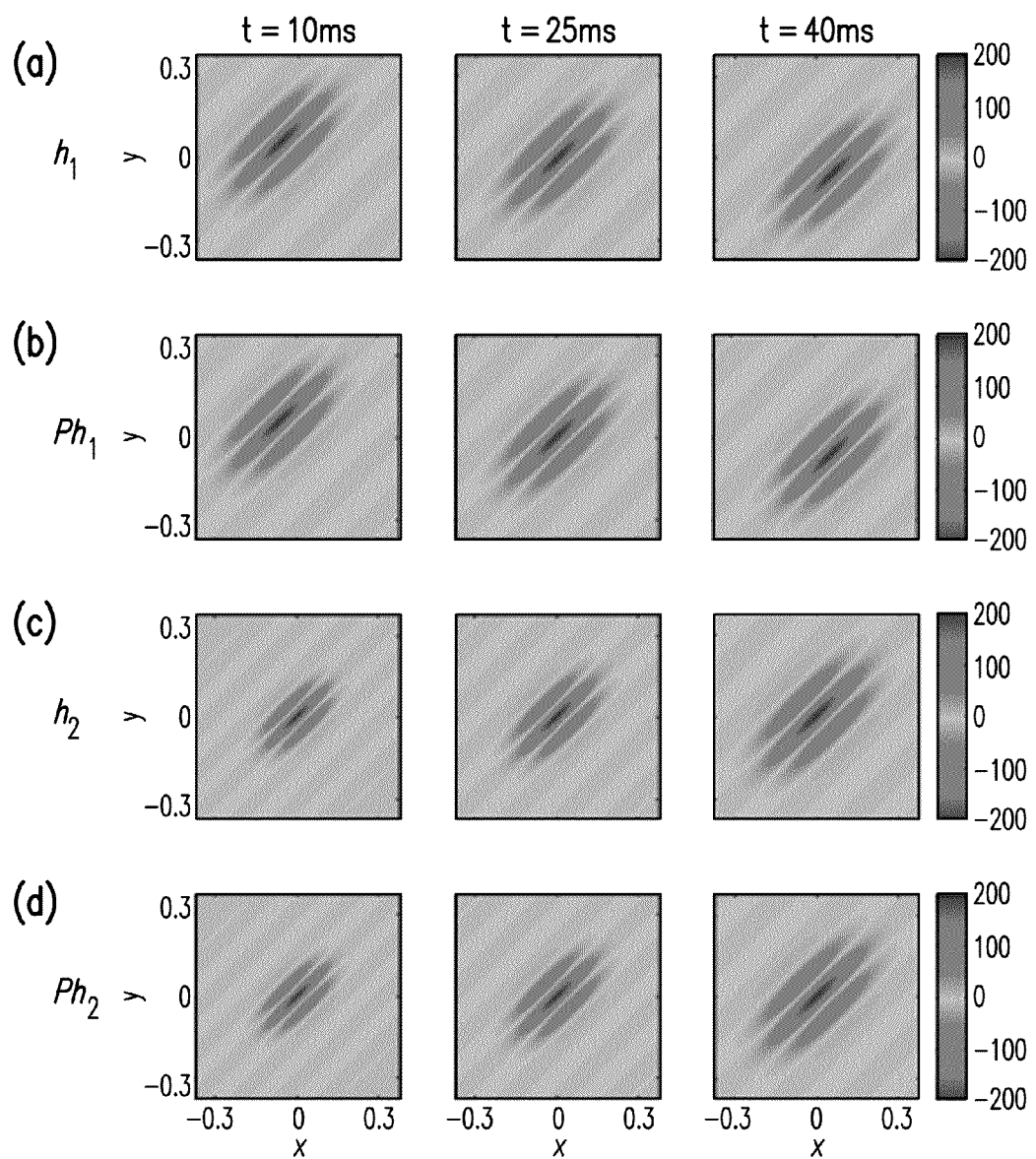
FIG. 12B illustrates a further exemplary technique for identification of neural circuits according to the disclosed subject matter.
Figure 12B:
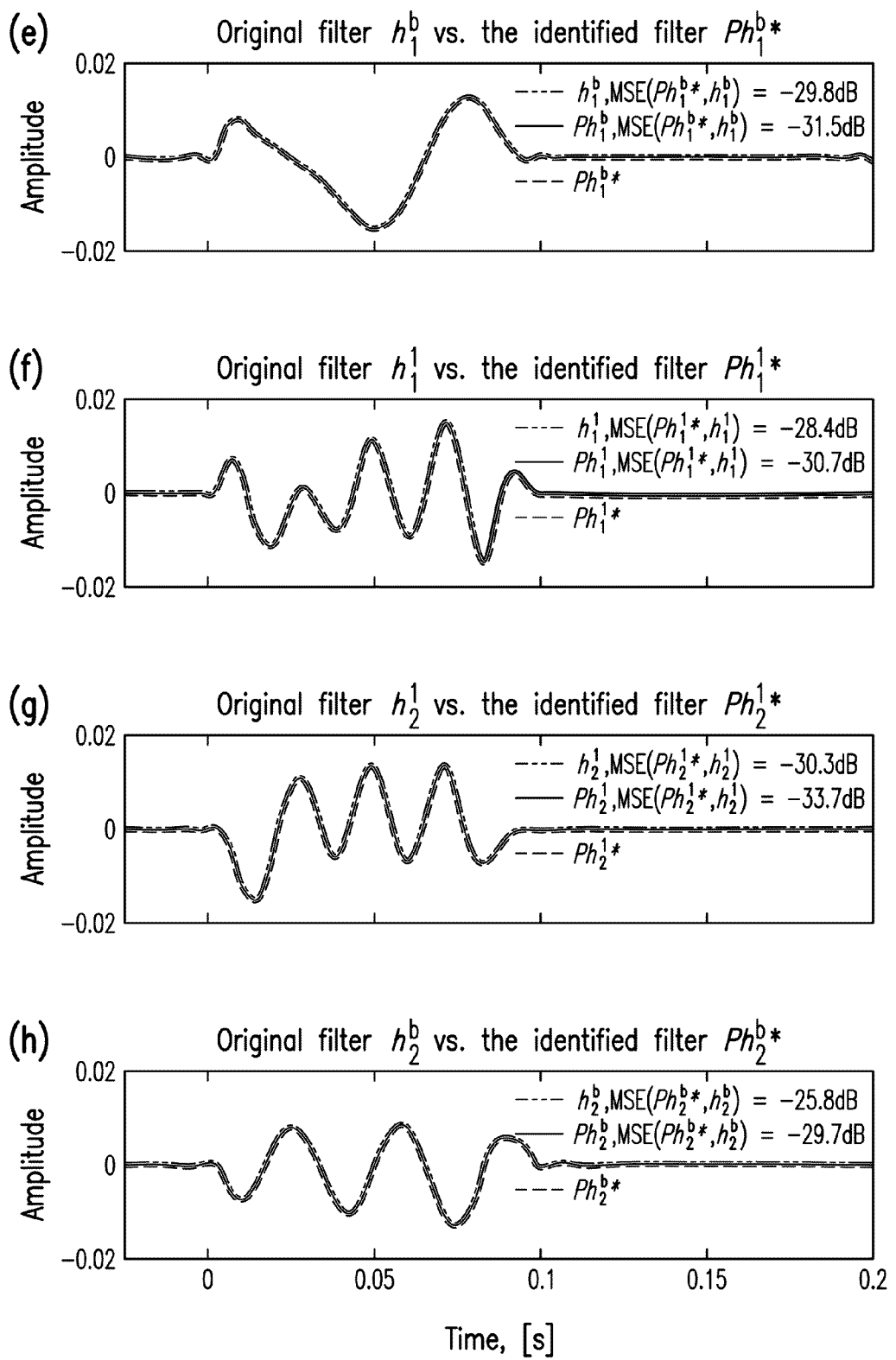

Identification results for circuit 1200 are illustrated in FIG. 12B. For purpose of illustration, and as embodied herein, the spatiotemporal receptive fields used in this simulation were non-separable. The first receptive field can be represented as a single spatial Gabor function (at time t=0) translated in space with uniform velocity as a function of time, while the second receptive field can be represented as a spatial Gabor function uniformly dilated in space as a function of time. Three different time frames of the original and the identified receptive field of the first neuron are illustrated in the top two rows of FIG. 12B. Additionally, three time frames of the original and identified receptive field of the second neuron are illustrated in the bottom two rows of FIG. 12B. The identified lateral and feedback kernels are illustrated in plots (e-h) of FIG. 12B.

As described herein, systems and techniques for identifying receptive fields in spike-processing neural circuits are provided. Exemplary circuits according to the disclosed subject matter can include, for example and without limitation, circuits with feedforward inputs, lateral connectivity and feedback. As illustrated herein, receptive fields can be identified directly from spike times produced by neurons. Utilizing spike times, and not the response rates, receptive fields can be identified with only a single experimental trial of sufficient length, as discussed herein. As such, the challenge of repeating experiments in a spiking neural circuit, including circuits that are not a part of any sensory system, for example in higher brain centers, can be eliminated.

The systems and techniques described herein do not assume that spikes at the output of a neuron are generated by a Poisson process. Instead, the generation of action potentials can be treated using a nonlinear spiking neuron model, for example and without limitation, a biophysical nonlinear conductance-based model (such as, Hodgkin-Huxley, Fitzhugh-Nagumo, Morris Lecar, etc.) or an integrate-and-fire neuron. Additionally or alternatively, the methods can be applied to non-biological systems that incorporate asynchronous samplers, such as the Asynchronous Sigma/Delta Modulator (ASDM) and oscillators with multiplicative and additive coupling, including the van der Pol oscillator, which can be utilized in nonlinear circuits.

Additionally, the spiking input the systems and techniques described herein do not need to include broadband Poisson spikes, a condition utilized to estimate the kernels in a generalized Volterra model (GVM). As such, identification with broadband Poisson spikes involves artificial stimulation of presynaptic terminals of a neuron. For purpose of comparison, the systems and techniques according to the disclosed subject matter can allow for use of the recorded spikes produced by real neurons in a biological circuit. While a GVM can include a nonlinearity in the receptive field of the neuron, the nonlinear effects discussed herein can be found in the spike generation mechanism.

As discussed herein, the systems and methods according to the disclosed subject matter can be generalizable and scalable. With regard to input signals, the disclosed subject matter can accommodate a broad class of model stimuli, including and without limitation a mixture of spiking and continuous stimuli. With regard to receptive fields, the disclosed subject matter can be applied to temporal receptive fields arising in higher brain centers, as well as spatial, spatiotemporal and spectrotemporal receptive fields encountered in early sensory systems (for example and without limitation, olfaction, vision and audition). With regard to the circuit architecture, the disclosed subject matter can accommodate models with complex connectivity, including models with any number of feedforward, lateral and feedback connections. The identified receptive fields can provide important information about how inputs are processed, what kind of connections exist between neurons (excitatory or inhibitory), and/or whether a connection exists at all.

The foregoing merely illustrates the principles of the disclosed subject matter Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A method for identification of a spike-processing circuit, comprising:
   receiving a plurality of spike trains corresponding to a circuit input over a time period;
   selecting a number of spikes for each of the plurality of input spike trains over a predetermined time window;
   replacing each of the selected spikes with a sampled reproducing kernel to obtain a plurality of signals, each obtained signal corresponding to one of the plurality of input spike trains;
   passing each of the obtained signals through a plurality of receptive fields or filters to obtain an aggregate filter output signal; and
   encoding the filter output signal into an output spike train, the output spike train corresponding to a response of the circuit to the plurality of input spike trains.

2. The method of claim 1, wherein the circuit input corresponds to an input to a neuron, an asynchronous sampling circuits, or an oscillator circuit.

3. The method of claim 1, wherein the circuit input comprises a lateral input and a feedback input.

4. The method of claim 1, wherein one or more of the obtained signals comprises a periodic signal.

5. The method of claim 1, wherein the filter output signal comprises a dendritic current.

6. The method of claim 1, wherein the encoding the filter output signal comprises encoding using an integrate-and-fire neuron.

7. The method of claim 1, wherein the encoding the filter output signal comprises encoding using a Hodgkin-Huxley neuron.

8. The method of claim 1, wherein the encoding the filter output signal comprises encoding using an Asynchronous Sigma Delta Modulator (ASDM).

9. The method of claim 1, wherein the encoding the filter output signal comprises encoding using an oscillator.

10. The method of claim 9, wherein the oscillator comprises additive or multiplicative coupling.

11. The method of claim 9, wherein the oscillator comprises a van der Pol oscillator.

12. The method of claim 1, wherein the predetermined time window corresponds to $2\pi L/\Omega$, where L corresponds to an order of a signal space of the plurality of input spike trains and $\Omega$ corresponds to a bandwidth of the plurality of input spike trains.

13. The method of claim 1, wherein the number of windows is N, the number of receptive fields is M, and the number of selected spikes is greater than or equal to $M(2L+1)+N$.

14. The method of claim 1, wherein each of the plurality of receptive fields consists of a single dimension over time.

15. The method of claim 1, further comprising receiving a plurality of continuous, one-dimensional signals corresponding to the circuit input, wherein each of the plurality of receptive fields consists of a single dimension over time.

16. The method of claim 1, further comprising receiving a plurality of continuous signals having a dimension greater than one, and one or more of the plurality of receptive fields comprises a one-dimensional filter and one or more of the plurality of receptive fields comprises a multi-dimensional filter.

17. The method of claim 16, wherein the plurality of continuous signals comprises one or more audio-visual signals.

18. A system for identification of a spike-processing circuit, comprising:
   one or more inputs configured to receive a plurality of spike trains corresponding to a circuit input over a time period;
   a windowing circuit operatively coupled to the one or more inputs and configured to select a number of spikes for each of the plurality of spike trains over a predetermined time window;
   a kernel processor configured to receive the selected spikes and replace each of the selected spikes with a sampled reproducing kernel to obtain a plurality of signals, each obtained signal corresponding to one of the plurality of input spike trains;
   a plurality of receptive fields or filters configured to obtain an aggregate filter output signal from the obtained signals; and
   a neuronal encoder configured to receive the aggregate dendritic current and encode an output spike train, the output spike train corresponding to a response of the circuit to the plurality of input spike trains.

19. The system of claim 18, wherein the circuit input corresponds to an input to a neuron, an asynchronous sampling circuits, or an oscillator circuit.

20. The system of claim 18, wherein the circuit input comprises a lateral input and a feedback input.

21. The system of claim 18, wherein one or more of the obtained signals comprises a periodic signal.

22. The system of claim 18, wherein the filter output signal comprises a dendritic current.

23. The system of claim 18, wherein the neuronal encoder comprises an integrate-and-fire neuron.

24. The system of claim 18, wherein the neuronal encoder comprises a Hodgkin-Huxley neuron.

25. The system of claim 18, wherein the neuronal encoder comprises an Asynchronous Sigma Delta Modulator (ASDM).

26. The system of claim 18, wherein the neuronal encoder comprises an oscillator.

27. The system of claim 26, wherein the oscillator comprises additive or multiplicative coupling.

28. The system of claim 26, wherein the oscillator comprises a van der Pol oscillator.

29. The system of claim 18, wherein the predetermined time window corresponds to $2\pi L/\Omega$, where L corresponds to an order of a signal space of the plurality of input spike trains and $\Omega$ corresponds to a bandwidth of the plurality of input spike trains.

30. The system of claim 18, wherein the number of windows is N, the number of receptive fields is M, and the number of selected spikes is greater than or equal to $M(2L+1)+N$.

31. The system of claim 18, wherein each of the plurality of receptive fields consists of a single dimension over time.

32. The system of claim 18, wherein the one or more inputs is further configured to receive a plurality of continuous, one-dimensional signals corresponding to the circuit input, wherein each of the plurality of receptive fields consists of a single dimension over time.

33. The system of claim 18, wherein the one or more inputs is further configured to receive a plurality of continuous signals having a dimension greater than one, one or more of the plurality of receptive fields comprises a one-dimensional filter, and one or more of the plurality of receptive fields comprises a multi-dimensional filter.

34. The system of claim 33, wherein the plurality of continuous signals comprises one or more audio-visual signals.

\* \* \* \* \*